United States Patent
Aeron et al.

(10) Patent No.: US 8,339,897 B2
(45) Date of Patent: Dec. 25, 2012

(54) AUTOMATIC DISPERSION EXTRACTION OF MULTIPLE TIME OVERLAPPED ACOUSTIC SIGNALS

(75) Inventors: Shuchin Aeron, Brookline, MA (US);
Sandip Bose, Brookline, MA (US);
Henri-Pierre Valero, Yokohama (JP);
Venkatesh Saligrama, Newton Center, MA (US)

(73) Assignees: Schlumberger Technology Corporation, Sugar Land, TX (US);
Trustees of Boston University, Boston, MA (US)

( * ) Notice: Subject to any disclaimer, the term of this patent is extended or adjusted under 35 U.S.C. 154(b) by 382 days.

(21) Appl. No.: 12/644,862

(22) Filed: Dec. 22, 2009

(65) Prior Publication Data

US 2010/0157731 A1    Jun. 24, 2010

Related U.S. Application Data

(60) Provisional application No. 61/139,996, filed on Dec. 22, 2008.

(51) Int. Cl.
*G01V 1/50* (2006.01)
(52) U.S. Cl. ............................ 367/32; 367/25; 367/38
(58) Field of Classification Search .............. 367/25, 367/31, 32
See application file for complete search history.

(56) References Cited

U.S. PATENT DOCUMENTS

| | | | |
|---|---|---|---|
| 5,278,805 A * | 1/1994 | Kimball | 367/32 |
| 6,449,560 B1 | 9/2002 | Kimball | |
| 6,614,716 B2 * | 9/2003 | Plona et al. | 367/31 |
| 7,120,541 B2 | 10/2006 | Wang | |
| 7,649,805 B2 | 1/2010 | Bose et al. | |
| 7,660,196 B2 | 2/2010 | Saiki et al. | |
| 7,668,043 B2 | 2/2010 | Wu | |
| 2006/0120217 A1 * | 6/2006 | Wu et al. | 367/32 |
| 2008/0270055 A1 | 10/2008 | Rozell et al. | |
| 2008/0319675 A1 * | 12/2008 | Sayers | 702/11 |

OTHER PUBLICATIONS

Shuchin Aeron, "Automatic dispersion extraction using continuous wavelet transform", IEEE, Department of ECE, Boston University, 2008, pp. 24052408.
Combes et al, "Wavelets time-frequency methods and phase space", Proceedings of the International Conference, Marseille, France, Springer-Verlag, Dec. 14-18, 1987, 20 pages.
Michael Ekstrom, "Dispersion estimation from borehole acoustic arrays using a modified matrix pencil algorithm", IEEE, Ser. 29th Asilomar Conference on Signals, Systems and Computers, vol. 2, 1995, pp. 449-453.

(Continued)

*Primary Examiner* — Ian Lobo

(57) ABSTRACT

Slowness dispersion characteristics of multiple possibly interfering signals in broadband acoustic waves as received by an array of two or more sensors are extracted without using a physical model. The problem of dispersion extraction is mapped to the problem of reconstructing signals having a sparse representation in an appropriately chosen over-complete dictionary of basis elements. A sparsity penalized signal reconstruction algorithm is described where the sparsity constraints are implemented by imposing a $l_1$ norm type penalty. The candidate modes that are extracted are consolidated by means of a clustering algorithm to extract phase and group slowness estimates at a number of frequencies which are then used to reconstruct the desired dispersion curves. These estimates can be further refined by building time domain propagators when signals are known to be time compact, such as by using the continuous wavelet transform.

8 Claims, 20 Drawing Sheets

OTHER PUBLICATIONS

W. Feller, "On the kolmogorov-smirnov limit theorems for empirical distributions", Annals of Mathematics Statistics, vol. 19, pp. 177-189, 1948.

Christopher Kimball, "Shear slowness measurement by dispersive processing of the borehole flexural mode", Geophysics, vol. 63, No. 2 (Mar.-Apr. 1998) pp. 337-344.

Lang et al, "Estimating slowness dispersion from arrays of sonic logging waveforms", Geophysics, vol. 52, No. 4, (Apr. 1987), pp. 530-544.

Prosser et al, "Time-frequency analysis of the dispersion of lamb modes", J. Acoustic. Soc. Am. 105, (5), pp. 2669-2676, May 1999.

Roueff et al, "Dispersion estimation from linear array data in the time-frequency plane", IEEE Transaction on Signal Processing, vol. 53, No. 10, Oct. 2005, pp. 3738-3748.

Sinha et al, "Sonics and Ultarsonics in Geophysical Prospecting", Schlumberger Doll Research Tech. Rep., Aug. 1998, 77 pages.

Tropp et al, "Algorithms for simultaneous sparse approximation Part I: greedy pursuit", Signal Processing, special issue on Sparse approximations in signal and image processing, vol. 86, pp. 572-588, Apr. 2006.

K means clustering url: http://www.mathworks.com/help/toolbox/stats/kmeans.html, printed Oct. 28, 2010, 4 pages.

* cited by examiner

AUTOMATIC DISPERSION EXTRACTION OF MULTIPLE TIME OVERLAPPED ACOUSTIC SIGNALS

CROSS-REFERENCE TO RELATED APPLICATIONS

This application claims the benefit of U.S. Provisional Application No. 61/139,996, filed Dec. 22, 2008, which is incorporated by reference.

BACKGROUND OF THE INVENTION

This invention relates broadly to the extraction of the slowness dispersion characteristics of multiple possibly interfering signals in broadband acoustic waves, and more particularly to the processing of acoustic waveforms where there is dispersion, i.e. a dependence of wave speed and attenuation with frequency.

Dispersive processing of borehole acoustic data has been a key ingredient for the characterization and estimation of rock properties using borehole acoustic modes. The most common parameters describing the dispersion characteristics are the wavenumber, k(f), and the attenuation, A(f), both functions of the frequency f and are of great interest in characterization of rock and fluid properties around the borehole. In addition, they are of interest in a variety of other applications such as non-destructive evaluation of materials using ultrasonic waves or for handling ground roll in surface seismic applications, where the received data exhibits dispersion that needs to be estimated. The dispersion characteristic consisting of the phase and group slowness (reciprocal of velocity) are linked to the wavenumber k as follows:

$$s_o(f) = \frac{1}{V_{phase}(f)} = \frac{k(f)}{f} \cdot s_g(f) = \frac{1}{V_{group}(f)} = \frac{dk(f)}{df} \quad (1)$$

where the group slowness $s_g$ and phase slowness $s_\phi$ are not independent; in fact, they satisfy $$s_g = s_\phi + f \frac{ds_\phi}{df}$$

There is therefore the need to extract these quantities of interest from the measured acoustic data.

One class of extraction methods uses physical models relating the rock properties around the borehole to the predicted dispersion curves. Waveform data collected by an array of sensors is back propagated according to each of these modeled dispersion curves and the model is adjusted until there is good semblance (defined below) among these back propagated waveforms indicating a good fit of the model to the data. An example is the commercial DSTC algorithm used for extracting rock shear velocity from the dipole flexural mode (see C. Kimball, "Shear slowness measurement by dispersive processing of borehole flexural mode," *Geophysics*, vol. 63, no. 2, pp. 337-344, March 1998) (in this case we directly invert for the rock property of interest). One drawback of this method is that models are available for only the simpler cases and, moreover, some other physical parameters need to be known in order to carry out this process. In the case of model mismatch or error in parameter input, incorrect (biased) answers may be produced. In addition, this processing assumes the presence of only a single modeled propagating mode and pre-processing steps such as time windowing and filtering may be needed to isolate the mode of interest. These also require user input and in some cases the answers may be sensitive to the latter, requiring expert users for correctly processing the data. Another approach based on multiwave processing was proposed in C. Kimball, "Sonic well logging with multiwave processing utilizing a reduced propagation matrix," US Patent Application Publication 2000552075A, but it too is dependent on the use of models and is applicable to a limited number of cases.

One way of addressing such drawbacks is to directly estimate the dispersion characteristics from the data without reference to particular physical models. Not only can these be used for quantitative inversion of parameters of interest but the dispersion curves carry important information about the acoustic state of the rock and are important tools for interpretation and validation. Moreover, in order to be part of a commercial processing chain, these have to be free of user inputs so as to operate in an automated unsupervised fashion. A classical method of extracting this information from data collected by an array of sensors, for example, in seismic applications, is to use a 2D FFT, also called the f-k (frequency wavenumber) transform. This indicates the dispersion characteristics of propagating waves both dispersive and non-dispersive, but is effective only with large arrays of tens of sensors. For applications with fewer sensors as commonly found in sensor arrays (2-13 sensors) on borehole wireline and LWD tools, this method does not have the necessary resolution and accuracy to produce useful answers.

A high resolution method appropriate for shorter arrays was developed using narrow band array processing techniques applied to frequency domain data obtained by performing an FFT on the array waveform data (see S. Lang, A. Kurkjian, J. McClellan, C. Morris, and T. Parks, "Estimating slowness dispersion from arrays of sonic logging waveforms," *Geophysics*, vol. 52, no. 4, pp. 530-544, April 1987 and M. P. Ekstrom, "Dispersion estimation from borehole acoustic arrays using a modified matrix pencil algorithm," ser. 29th Asilomar Conference on Signals, Systems and Computers, vol. 2, 1995, pp. 449-453). While this is an effective tool for studying dispersion behavior in a supervised setting, it produces unlabelled dots on the f-k plane and therefore is not suitable for deployment for automated unsupervised processing. Moreover the operation of FFT washes out the information pertaining to the time of arrival of various propagating modes, thereby reducing its performance as well as the effectiveness of interpretation—especially for weaker modes of interest overlapping with stronger ones in the frequency domain (see B. Sinha and S. Zeroug, "Geophysical prospecting using sonics and ultrasonics," Schlumberger-Doll Research, Tech. Rep., August 1998). It also does not exploit the continuity across frequency of the dispersion characteristics.

Recently developed algorithms (see W. H. Prossner and M. D. Seale, "Time frequency analysis of the dispersion of lamb modes," *Journal of Acoustical Society of America*, vol. 105, no. 5, pp. 2669-2676, May 1999 or A. Roueff, J. I. Mars, J. Chanussot, and H. Pedersen, "Dispersion estimation from linear array data in the time-frequency plane," *IEEE Transactions on Signal Processing*, vol. 53, no. 10, pp. 3738-378, October 2005. Or S. Aeron, S. Bose, and H. P. Valero, "Automatic dispersion extraction using continuous wavelet transform," in *International Conference of Acoustics, Speech and Signal Processing,* 2008 or S. Bose, S. Aeron and H. P. Valero, "Dispersion extraction for acoustic data using time frequency analysis," 60.1752/1753, US NP, filed 2007) have been proposed using a time frequency analysis with continuous wavelet transform or short time Fourier transform along with beamforming methods. However, these require that either there is only one component or, if more than one, that they do not overlap in the time-frequency plane.

SUMMARY OF THE INVENTION

Slowness dispersion characteristics of multiple possibly interfering signals in broadband acoustic waves as received by an array of two or more sensors are extracted without using a physical model. The problem of dispersion extraction is mapped to the problem of reconstructing signals having a sparse representation in an appropriately chosen over-complete dictionary of basis elements. A sparsity penalized signal reconstruction algorithm can be used where the sparsity constraints are implemented by imposing a $l_1$ norm type penalty. The candidate modes that are extracted can be consolidated by means of a clustering algorithm to extract phase and group slowness estimates at a number of frequencies which are then used to reconstruct the desired dispersion curves. These estimates can be further refined by building time domain propagators when signals are known to be time compact, such as by using the continuous wavelet transform. The result is a general approach (without using specific physical models) for estimating dispersion curves for multiple signals (unknown number) that could overlap in the time-frequency domain.

The algorithm advantageously involves the solution of a convex optimization problem that is computationally efficient to implement. Another advantage of this approach is that the model order selection is automatically taken care of as the sparsity conditions ensure that only the candidate modes are extracted as long as the regularization parameter for the penalty is chosen in an appropriate range.

BRIEF DESCRIPTION OF THE FIGURES

FIG. 13 is a schematic representation of the first order Taylor series approximation to the dispersion curve in a band around the center frequency fa of the mother wavelet at scale a.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments.

A process may correspond to a method, a function, a procedure, a subroutine, a subprogram, etc. When a process corresponds to a function, its termination corresponds to a return of the function to the calling function or the main function.

Embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
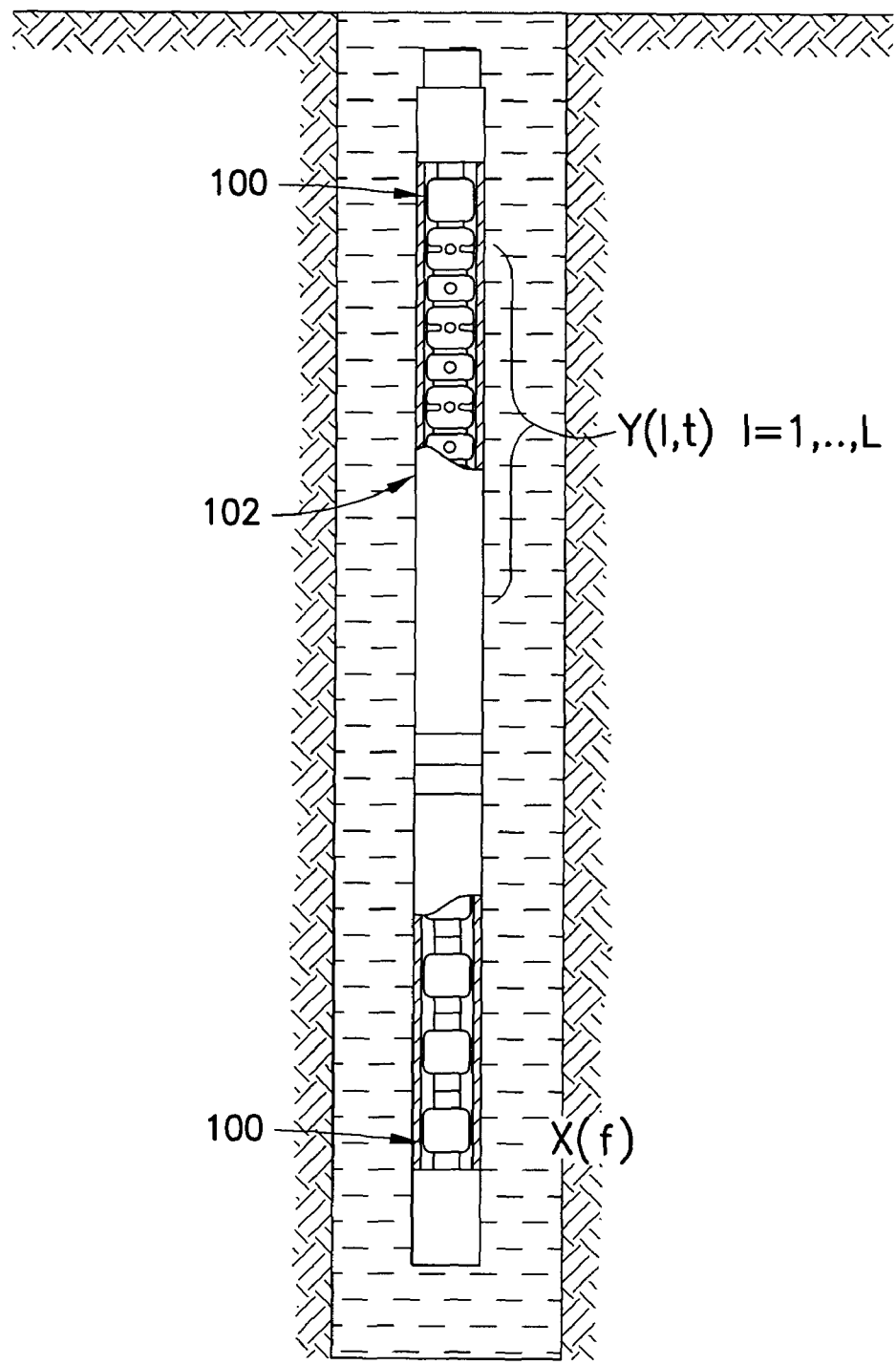
FIG. 1 is a schematic representation of a physical set-up for acquisition of waves in a borehole.

Referring now to FIG. 1, an acoustic source (100) which may be in communication with surface equipment is fired in a fluid filled borehole and the resulting waves that are generated in the borehole are recorded at a linear array of sonic sensors (hydrophones) (102) located on the acoustic tool. The relationship between the received waveforms and the wavenumber-frequency (k-f) response of the borehole to the source excitation is captured via the following equation (2), $$s(l, t) = \int_0^\infty \int_0^\infty S(f)Q(k, f)e^{i2\pi ft}e^{-ikz_l}dfdk$$

for l=1, 2, ..., L and where $s(l,t)$ denotes the pressure at time t at the l-th sensor located at a distance $z_l$ from the source; $S(f)$ is the source spectrum and $Q(k,f)$ is the wavenumber-frequency response of the borehole. Typically the data is acquired in the presence of noise (environmental noise and sensor noise) and interference (unmodelled energy), collectively denoted by $w(l,t)$. The noisy observations at the set of sensors can be expressed as, $$y(l,t)=s(l,t)+w(l,t) \quad (3)$$

Figure 2:
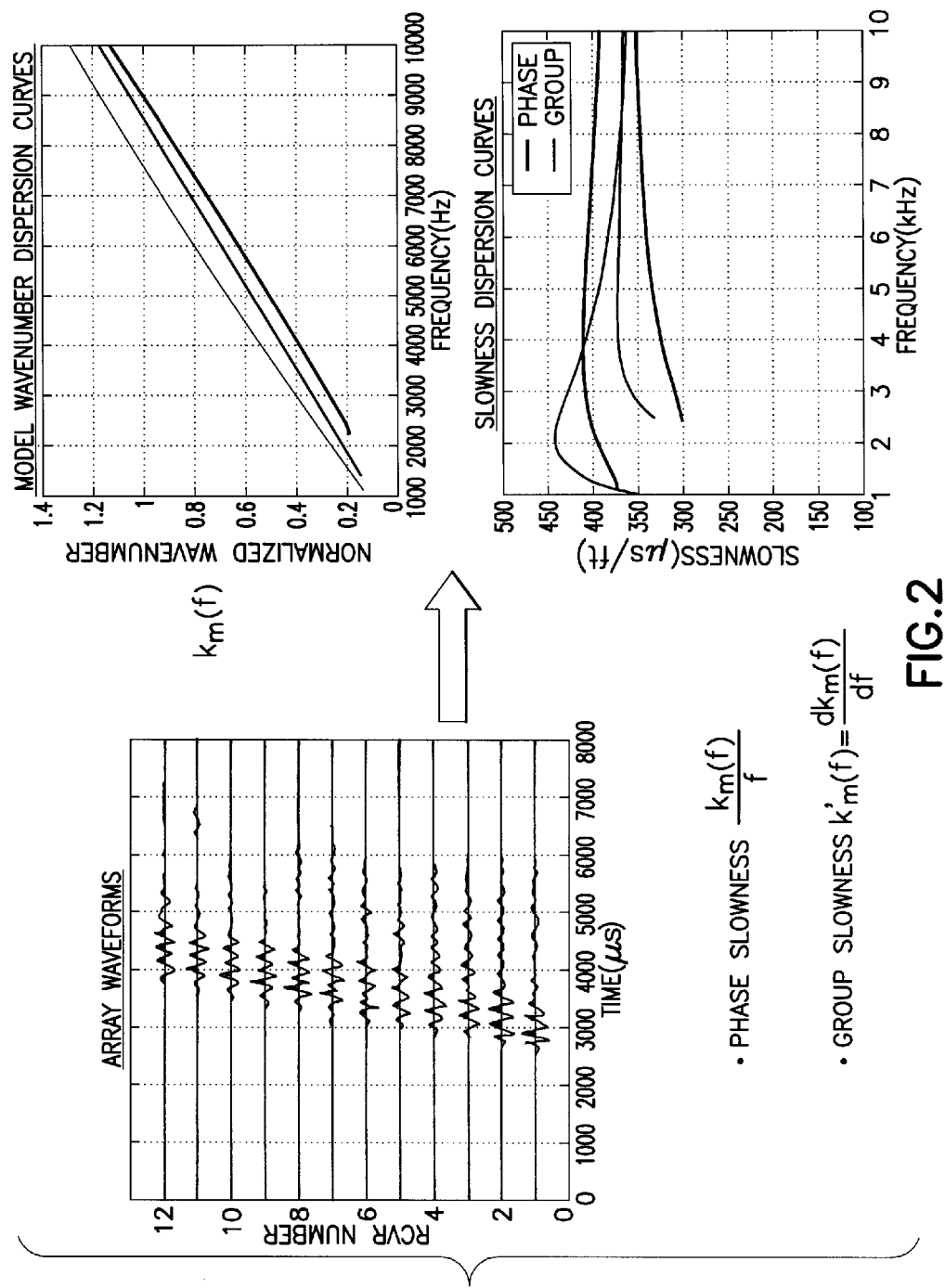
FIG. 2 illustrates the array waveforms and modal dispersion curves governing the propagation of the acoustic energy.

It has been shown that the complex integral in the wavenumber (k) domain in equation 2 can be approximated by contribution due to the residues of a finite number, M(f) of poles of the system response, (3). Specifically, $$\int_0^\infty Q(k, f)e^{-ikz_l} dk \sim \sum_{m=1}^{M(f)} q_m(f)e^{-(i2\pi k_m(f)+a_m(f))z_l} \quad (4)$$

where $k_m(f)$ and $a_m(f)$ are the wavenumber and the attenuation as functions of frequency. Consequently, $$s(l, t) = \int_0^\infty \sum_{m=1}^{M(f)} S_m(f)e^{-(i2\pi k_m(f)+a_m(f))z_l} e^{i2\pi ft} df \quad (5)$$

where $S_m(f)=S(f)q_m(f)$. Under this signal model, the data acquired at each frequency across the sensors can be expressed as shown in FIG. 2, wherein the array waveforms and modal dispersion curves govern the propagation of the acoustic energy. The task is therefore to estimate these dispersion curves given the received waveforms.

$$\begin{bmatrix} Y_1(f) \\ Y_2(f) \\ \vdots \\ Y_L(f) \end{bmatrix} = \begin{bmatrix} e^{-(i2\pi k_1(f)+a_1(f))z_1} & \cdots & e^{-(i2\pi k_M(f)+a_M(f))z_1} \\ e^{-(i2\pi k_1(f)+a_1(f))z_2} & \cdots & e^{-(i2\pi k_M(f)+a_M(f))z_2} \\ \vdots & \cdots & \vdots \\ e^{-(i2\pi k_1(f)+a_1(f))z_L} & \cdots & e^{-(i2\pi k_M(f)+a_M(f))z_L} \end{bmatrix} \begin{bmatrix} S_1(f) \\ S_2(f) \\ \vdots \\ S_M(f) \end{bmatrix} + \begin{bmatrix} W_1(f) \\ W_2(f) \\ \vdots \\ W_L(f) \end{bmatrix} \quad (6)$$

Figure 12:
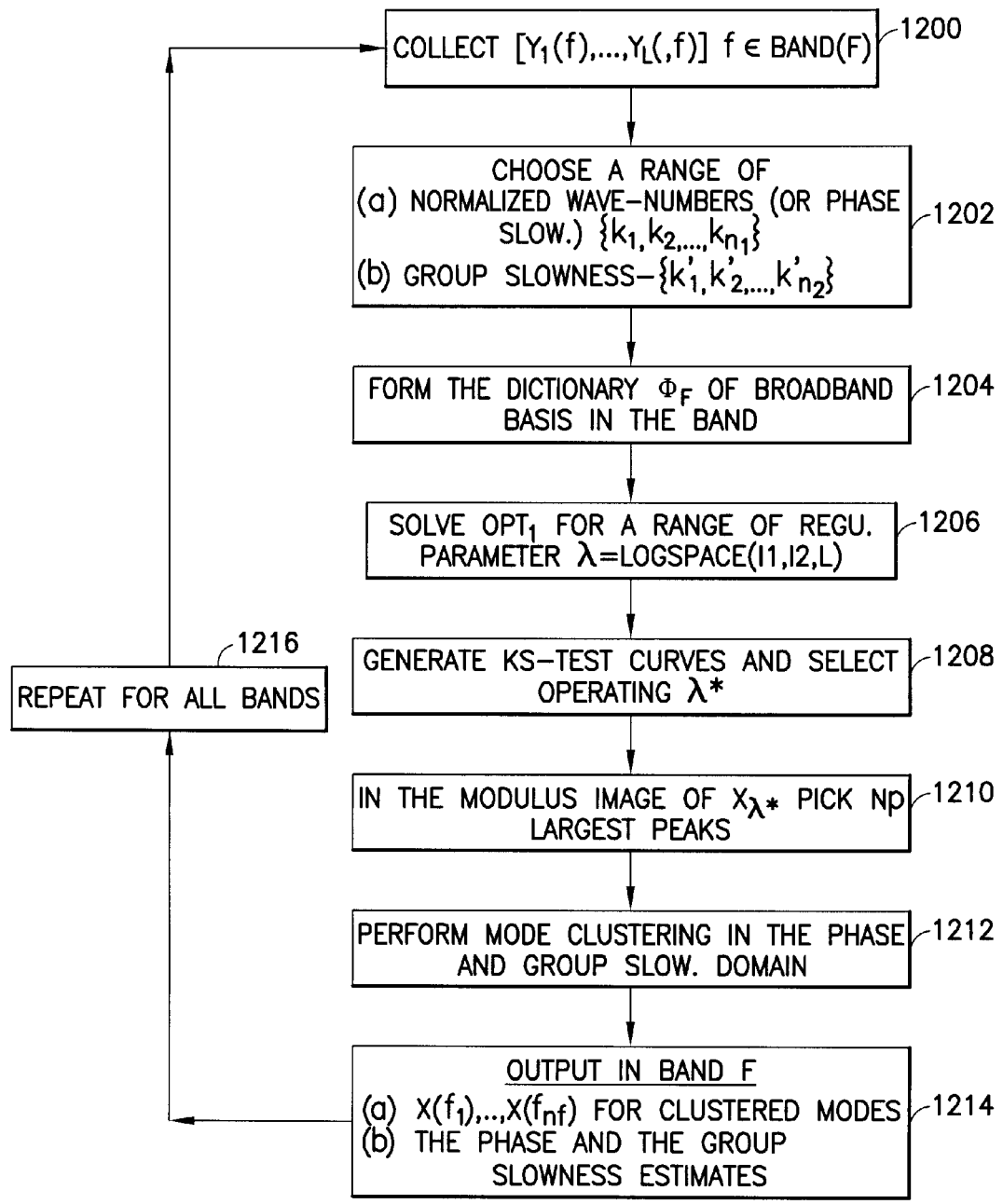
FIG. 12 illustrates the flow of processing in a band for dispersion extraction in the f-k domain.

In other words the data at each frequency is a superposition of M exponentials sampled with respect to the sensor locations $z_1, \ldots, z_L$. The above system of equations corresponds to a sum of exponential model at each frequency. M(f) is the effective number of exponentials at frequency f. A corresponding method step (1200) is shown in FIG. 12.

Although the dispersion curves corresponding to a mode in the f-k domain can be quite general, physical considerations result in smoothness across frequency and in practice admit a local linear approximation. In particular, the wavenumber as a function of frequency, i.e. the function(s) $k_m(f)$, can be well approximated by a first order Taylor series expansion in a certain band around a given frequency of interest. Mathematically it is assumed that a first order Taylor series expansion, $$k_m(f) \approx k_m(f_0)+k'_m(f_0)(f-f_0), \forall f \in \mathcal{F} = [f_0-f_B, f_0+f_B] \quad (7)$$

is valid in a band $f_B$ around a given center frequency $f_0$.

Figure 3:
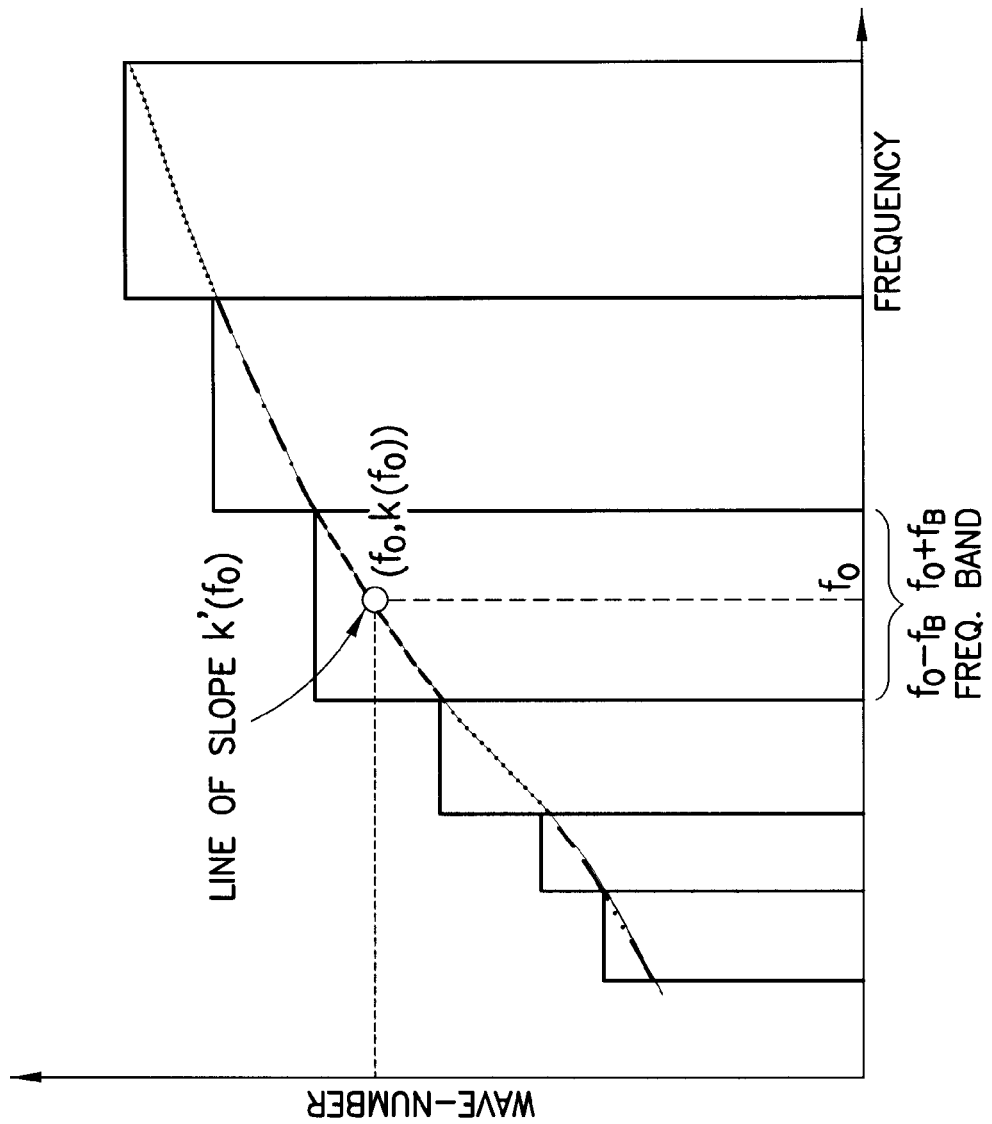
FIG. 3 is a schematic representation of the piecewise linear approximation to the dispersion curve. Also shown are the dispersion parameters corresponding to a first order Taylor series approximation in a band around f0.
Figure 4:
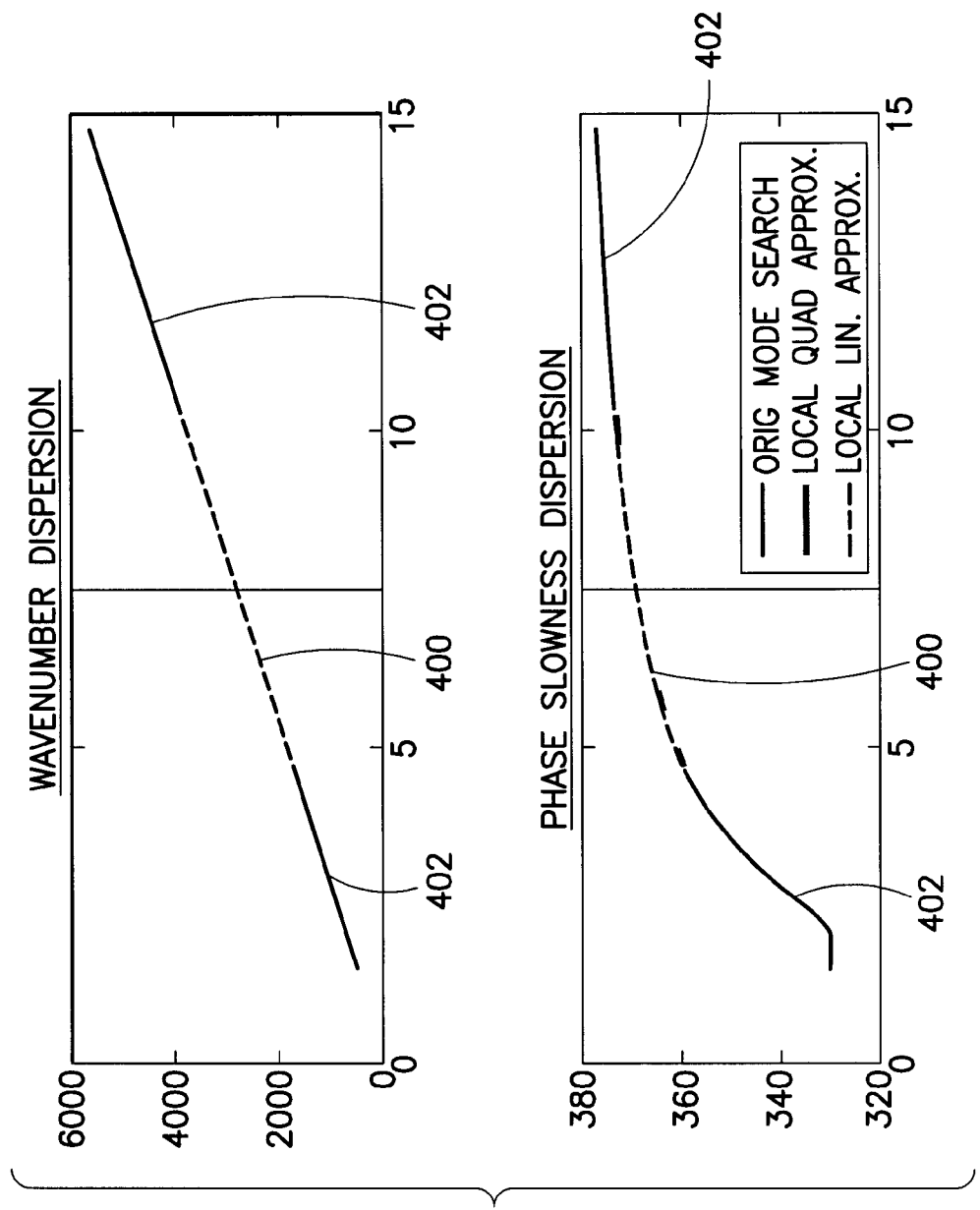
FIG. 4 illustrates the efficacy of local Taylor expansions of orders one and two in capturing the behavior of a typical quadrupole dispersion curve.

FIG. 4 illustrates the results of approximating a typical dispersion curve (quadrupole) with first and second order Taylor expansions (shown by the green (400) and red (402) curves, respectively). The local fit obtained thereby is quite adequate for capturing the local behavior of the dispersion curve. Those skilled in the art will note the efficacy of local Taylor expansions of orders one and two in capturing the behavior of a typical quadrupole dispersion curve. The local linear and quadratic approximations shown in red and blue respectively overlay and match the true dispersion curve well in a local interval. In other words, one can approximate the dispersion curve as composed of piecewise linear segments over adjacent frequency bands. For each frequency band the dispersion curve is parameterized by the phase and the group slowness. A corresponding step (1202) is shown in FIG. 12. For attenuation it is assumed that it is constant over the frequency band of interest, i.e., $a_m(f) \approx a_m(f_0), \forall f \in F$ FIG. 3 is a schematic depiction of the local linear approximation to a dispersion curve over adjacent frequency bands. Without loss of generality, assume that the number of modes is the same M(f)=M for all frequencies in the band of interest, and note that under the linear approximation of the dispersion curve(s) for the modes, the sampled exponential at a frequency f corresponding to a mode can be expressed in a parametric form as $$v_m(f) = \begin{bmatrix} e^{-i2\pi(k_m+k'_m(f-f_0))z_1}e^{-a_m(f_0)z_1} \\ e^{-i2\pi(k_m+k'_m(f-f_0))z_2}e^{-a_m(f_0)z_2} \\ \vdots \\ e^{-i2\pi(k_m+k'_m(f-f_0))z_L}e^{-a_m(f_0)z_L} \end{bmatrix}, \quad (8)$$

$m = 1, 2, \ldots, M, f, f_0 \in \mathcal{F}$.

It is apparent that over the set of frequencies f∈F, the collection of sampled exponentials (for a fixed m) $\{v_m(f)\}_{f \in \mathfrak{F}}$ as defined above corresponds to a line segment in the f-k domain thereby parametrizing the wavenumber response of the mode in the band in terms of phase and group slowness. In the following the band F is represented by F which is a finite set of frequencies contained in F.

$$F = \{f_1, f_2, \ldots, f_{N_f}\} \subset \mathcal{F} : f_0 \in F \quad (9)$$

Essentially in a time sampled system the discrete set of frequencies in F correspond to the discrete set of frequencies in the DFT of the data y(l,t) of equation 3. Under the linear approximation of dispersion curves in the band F, a broadband system of equations in the band can be expressed as, $$\begin{bmatrix} Y(f_1) \\ Y(f_2) \\ \vdots \\ Y(f_{N_f}) \end{bmatrix} = \begin{bmatrix} V_M(f_1) & & & \\ & V_M(f_2) & & \\ & & \ddots & \\ & & & V_M(f_{N_f}) \end{bmatrix} \begin{bmatrix} S(f_1) \\ S(f_2) \\ \vdots \\ S(f_{N_f}) \end{bmatrix} + W \quad (10)$$

where $S(f) = [S_1(f), S_2(f) \ldots S_M(f)]^T$ is the vector of mode(s) spectrum at f and $V_M(f) = [v_1(f_1), v_2(f_1) \ldots v_M(f_1)]$. In other words, the data in a frequency band is a superposition of exponentials at each frequency where the parameters of the complex exponentials are linked by phase and group slowness and attenuation factor across the frequencies. Accordingly, $$P_F(m) = \begin{bmatrix} v_m(f_1) & & & \\ & v_m(f_2) & & \\ & & \ddots & \\ & & & v_m(f_{N_f}) \end{bmatrix}, S_F(m) = \begin{bmatrix} S_m(f_1) \\ S_m(f_2) \\ \vdots \\ S_m(f_{N_f}) \end{bmatrix} \quad (11)$$

The matrix $P_F(m)$ corresponds to the matrix of exponentials for the wavenumber response for mode m in the band F, and the vector $S_F(m)$ is the vector of the mode spectrum for mode m in the band F. The signal (without noise) in band F is a superposition of M modes and can be written as, $$S_F = \sum_{m=1}^{M} P_F(m) S_F(m) \quad (12)$$

Now note that, under the piecewise linear approximation of the dispersion curves over adjacent frequency bands (could be partially overlapping), the problem of dispersion extraction can be reduced to the problem of estimating the linear parameters of these curves in each band. These are the corresponding phase and group slowness and attenuation and yield the dispersion curve in the band. The entire dispersion curve can then be obtained by combining the dispersion curves estimated as above in each of these bands. Thus, without loss of generality, it is reasonable to ignore the attenuation as this is usually small and does not bias the estimation of the wavenumber, and focus on dispersion extraction in a band. This can however be incorporated in the basis elements as shown above, but with the penalty of generating a much larger and computationally expensive system to solve. Alternatively, these could be estimated in a subsequent step after the wavenumbers have been estimated. So, given the data Y in the frequency band F it is desirable to estimate the model order M, the dispersion curves of the modes as modeled by the wavenumber response $P_F(m)$ in the band F, and the mode spectrum $S_F(m)$ for all m=1, 2, . . . , M.

A framework for dispersion extraction in f-k domain in a band can be understood by first considering a broadband basis element $P_F(k(f_0), k'(f_0))$ (also called a broadband propagator) in a band F corresponding to a given phase slowness $$\frac{k(f_0)}{f_0}$$

and group slowness $k'(f_0)$ as an operator.

$$P_F(k(f_0), k'(f_0)) = \begin{bmatrix} \phi(f_1) & & & \\ & \phi(f_2) & & \\ & & \ddots & \\ & & & \phi(f_{N_f}) \end{bmatrix} \in \mathbb{C}^{L \cdot N_f \times N_f} \quad (13)$$

consisting of exponential vectors $\phi(f)$ given by $$\phi(f) = \begin{bmatrix} e^{-i2\pi(k(f_0) + k'(f_0)(f - f_0))z_1} \\ e^{-i2\pi(k(f_0) + k'(f_0)(f - f_0))z_2} \\ \vdots \\ e^{-i2\pi(k(f_0) + k'(f_0)(f - f_0))z_L} \end{bmatrix} \in \mathbb{C}^{L \times 1} \quad (14)$$

From equation 12 (and ignoring the attenuation) it can be appreciated that the data in a given band is a superposition of broadband basis elements. Under this set-up a methodology for dispersion extraction in a band includes the following steps:

Given the band F around a center frequency $f_0$, form an over-complete dictionary of broadband basis elements $P_F(k_{ij}(f_0), k'_{ij}(f_0))$, ij=1, . . . , N in the f-k domain spanning a range of group and phase slowness. The number of basis elements, N, in the dictionary is much larger than the column span of all the elements in the dictionary. A corresponding step (1204) is shown in FIG. 12.

Assuming that the broadband signal is in the span of the broadband basis elements from the over-complete dictionary, the presence of a few significant modes in the band implies that the signal representation in the over-complete dictionary is sparse. In other words, the signal is composed of a superposition of few broadband propagators in the over-complete dictionary.

The problem of slowness dispersion extraction in the band can then be mapped to that of finding the sparsest signal representation in the over-complete dictionary of broadband propagators.

Therefore, the problem of dispersion estimation is mapped to that of finding the sparsest signal representation in an over-complete dictionary of broadband propagators spanning a range of group and phase slowness. Note that while, in general, the true propagators might not lie in the chosen over complete basis, this approach will still work so long as there are dictionary elements close to the true ones. In that case, the nearest basis elements are chosen in the sparse representation, possibly more than one for each mode, and the mismatch is subsumed in the noise.

Over-complete basis of broadband propagators in a band will now be described. In order to construct the over-complete basis, pick a range of wavenumber $k_i$, $i=1, 2, \ldots, N_1$ at the center frequency $f_0$ and a range of group slowness $k_j$, $j=1, 2, \ldots, N_2$ for the given band. Note that the range of wavenumbers in turn can be picked from the range of phase slowness the center frequency using the relation $$s_i^\phi(f_0) = \frac{k_i(f_0)}{f_0}.$$

In line with the broadband system given by Equation 10, the over-complete basis of broadband propagators for acoustic signal representation in a band can be expressed as $$\Phi = [\Psi_1(F) \vdots \Psi_2(F) \vdots \ldots \vdots \Psi_N(F)] \in \mathbb{C}^{L.N_f \times N.N_f} \quad (15)$$

where $\Psi_n(F) = P_F(k_i(f_0), k'_j(f_0))$ of equation 13 with $n=i+(j-1)N_2$, $i=1, 2, \ldots, N_1$, $j=1, 2, \ldots, N_2$ and $N=N_1 \times N_2$ is the number of elements in the over-complete dictionary.

Figure 5:
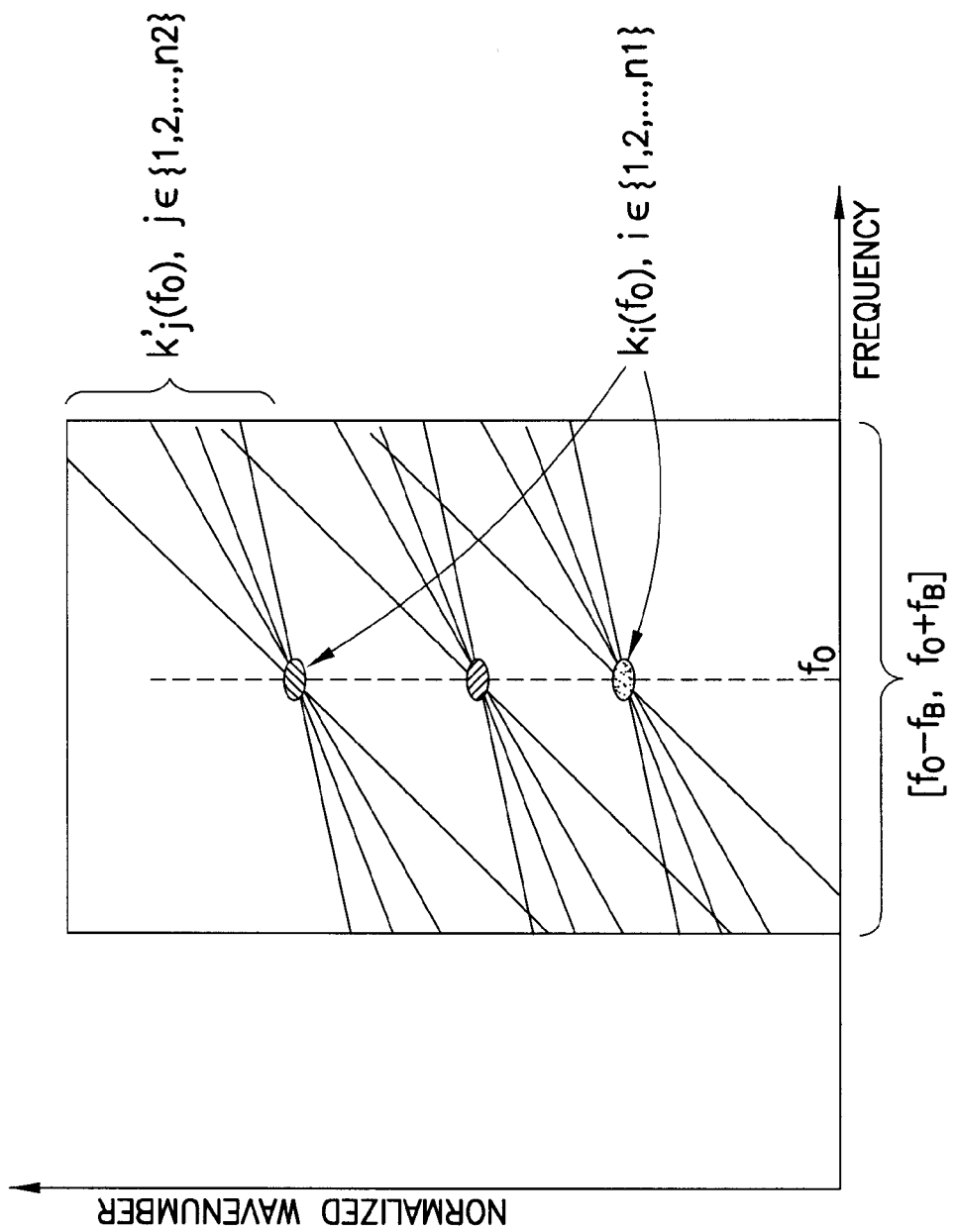
FIG. 5 illustrates a collection of broadband basis in a given band around the center frequency f0.

FIG. 5 illustrates an over-complete basis of broadband propagators in the given band in the f-k domain. Considering now the signal of equation 12 and assuming that the M broadband propagators are contained in the over complete dictionary $\Phi$, the problem set-up in the over-complete basis can be represented in terms of the latter $$S_F = \Phi x_M \quad (16)$$

with a special coefficient vector $x_M \in \mathbb{C}^{N.N \times 1}_f$ which has the property that most of its elements equal 0, i.e., it is sparse, with the only non-zero elements being the ones that correspond to the locations of the M propagators of equation 12. Note that as the above equation is massively under-determined, many coefficient vectors would satisfy it; however only the special vector has the type of sparsity stated above.

Figure 6:
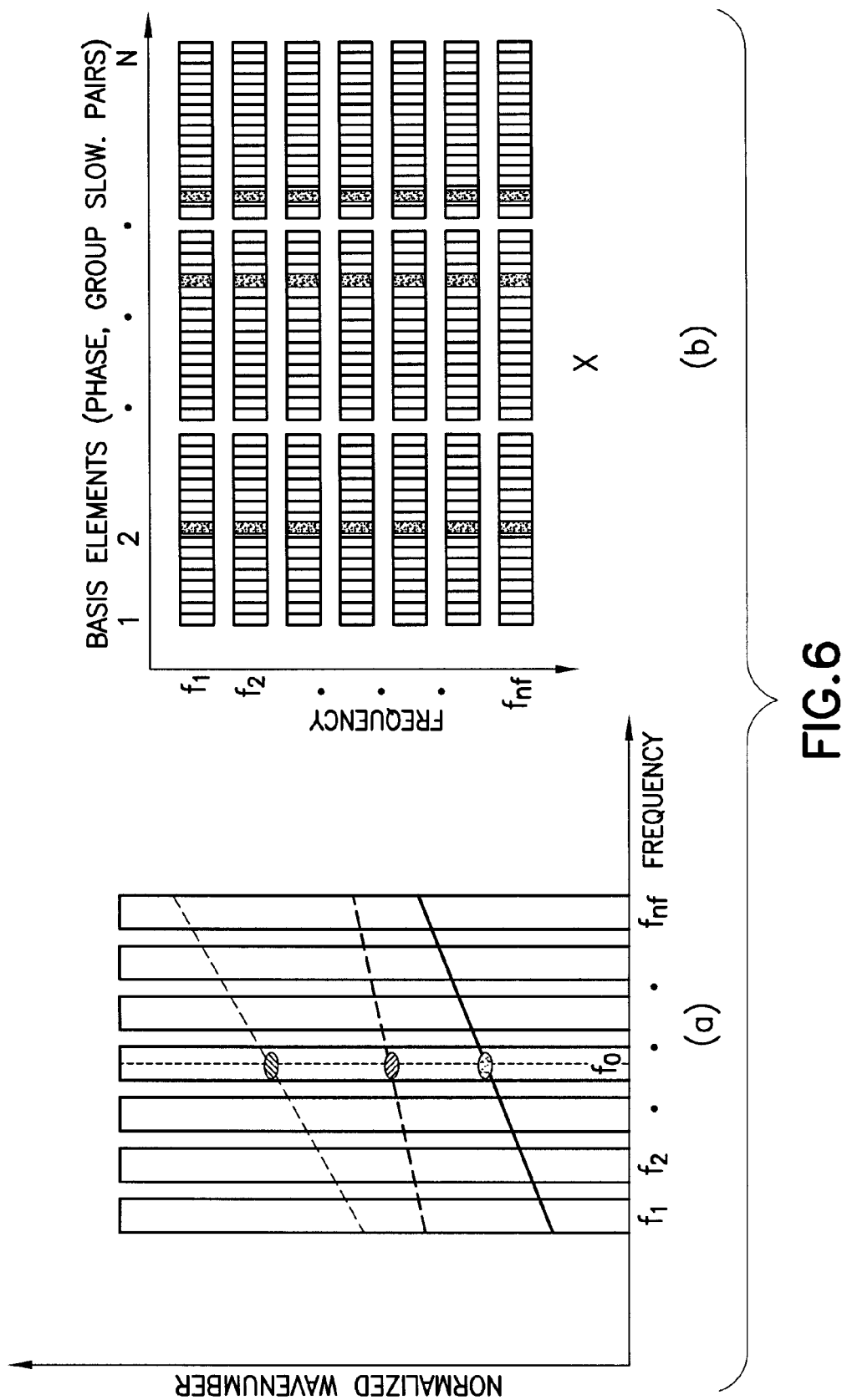
FIG. 6 is a schematic representation of the column sparsity of the signal support in $\Phi$. Sparsity of the number of modes in the band (a) implies a column sparsity in mode representation in the broadband basis in the band (b).

Referring now to FIG. 6, denoting $x(i_1 : i_2)$ as the vector consisting of the elements of x indexed from $i_1$ to $i_2$, a matrix X corresponding to x is constructed by reshaping it like so:

$$X = [x(1:N_f) \vdots x(N_f+1:2.N_f) \vdots \ldots \vdots x((N-1)N_f+1:NN_f)] \in \mathbb{C}^{N_f \times N}$$

Note that each column in $X_M$ corresponds to a basis element in $\Phi$ and therefore only those M columns in it corresponding to the location of the propagators representing the signal modes have non-zero entries, which are in fact simply the $S_F(m)$, $m=1, \ldots, M$. With $M \ll N$, $X_M$ exhibits column sparsity as shown in FIG. 6. The column support of X is represented by $1_x^C$, the column indicator function of X, consisting of 1's at the locations of the columns containing non-zero entries and 0's elsewhere. Assuming that the broadband propagators corresponding to the signal modes are linearly independent, among all coefficient vectors satisfying equation 16, $X_M$ has the smallest column support which corresponds to that of the true modes, i.e., the signal support. The signal support corresponds to the slowness dispersion parameters of the modes present in the data and its cardinality is the model order in the band.

The problem of dispersion extraction in the band F can be stated as follows. Given the set of observations at L sensors $Y=[Y^T(f_1)Y^T(f_2) \ldots Y^T(f_{N_f})]^T \in \mathbb{C}^{L.N \times 1}_f$ in a band $F=\{f_1: f_2: \ldots : f_{N_f}\}$ obeying the relation $$Y = \Phi x + W, x \in \mathbb{C}^{N_f.N \times 1} \quad (17)$$

with respect to an over-complete basis $\Phi \in \mathbb{C}^{M.N \times N.N}_{f12f}$ of broadband propagators, estimate X having the greatest column sparsity. Its column support would then yield the estimated dispersion parameters and model order in the band. The problem of dispersion extraction is thus mapped to that of finding the sparsest (column sparse) signal representation in an over-complete dictionary of broadband basis propagators in the given band. As will be described below, a convex optimization algorithm for dispersion extraction that exploits the particular sparsity structure of the signal support may be utilized.

The sparsity structure of the signal support in the broadband basis described above is also known as a simultaneous sparse structure in the literature e.g., see J. A. Tropp, A. C. Gilbert, and M. J. Strauss (J. A. Tropp, A. C. Gilbert, and M. J. Strauss, "Algorithms for simultaneous sparse approximation. part ii: Convex relaxation," *Signal Processing, special issue on Sparse approximations in signal and image processing*, vol. 86, pp. 572-588, April 2006). It is well known that for this set-up the optimal processing consists of solving the following optimization problem:

$$OPT_0 : \arg\min_X \|Y - \Phi x\|^2 + \lambda \sum_j 1_X^C(j) \quad (18)$$

for some appropriately chosen value of $\lambda$ for the penalty term which counts the number of non-zero columns of X. The latter is also known as $_0 l_2$ norm penalty and imposing it in the f-k domain on the solution dictates sparsity in the number of modes with a non-sparse spectrum in the frequency band. Note that when the additive noise W is i.i.d. Gaussian, solving this optimization problem is equivalent to solving a Maximum-Likelihood (ML) estimation problem. However, imposing the $_0 l_2$ penalty poses a combinatorial problem, which in general is very difficult to solve. It was proposed in J. A. Tropp, A. C. Gilbert, and M. J. Strauss to relax the $_0 l_2$ norm penalty to the $_1 l_2$ norm penalty (defined below) which is the closest convex relaxation to it. In accordance with one embodiment of this invention the following convex relaxation is used to solve the sparse reconstruction problem:

$$OPT_1 : \arg\min_X \|Y - \Phi x\|^2 + \lambda_1 \|X\|_2 \quad (19)$$

for some appropriately chosen value of $\lambda$ and where the norm $_1\|X\|_2$, is its $_1 l_2$ norm defined as the sum of the $l_2$ norms of the columns of the X $$_1\|X\|_2 = \sum_j \|X(:,j)\|_2 \quad (20)$$

where X(:,j) is the $j^{th}$ column of X. A corresponding step (1206) is shown in FIG. 12.

There are two issues to be addressed with regard to the framework and the proposed methodology. The first issue is selection of regularization parameter λ in the optimization problem $OPT_1$. With respect to the optimization problem $OPT_0$ this parameter governs the sparsity of the solution and thus is critical for model order selection. In the relaxed setup of $OPT_1$, apart from governing the sparsity of the solution this parameter also affects the spectrum estimates. This is due to solution shrinkage resulting from the $l_1$ part of the $_1l_2$ penalty. The second issue is the assumption that the true modes lie in the over-complete dictionary used above is not generally true. This has consequences for model order selection as well as for the estimates of dispersion parameters. However, if the true modes are close to elements in the dictionary, the effects are small and can be readily handled.

Figure 7:
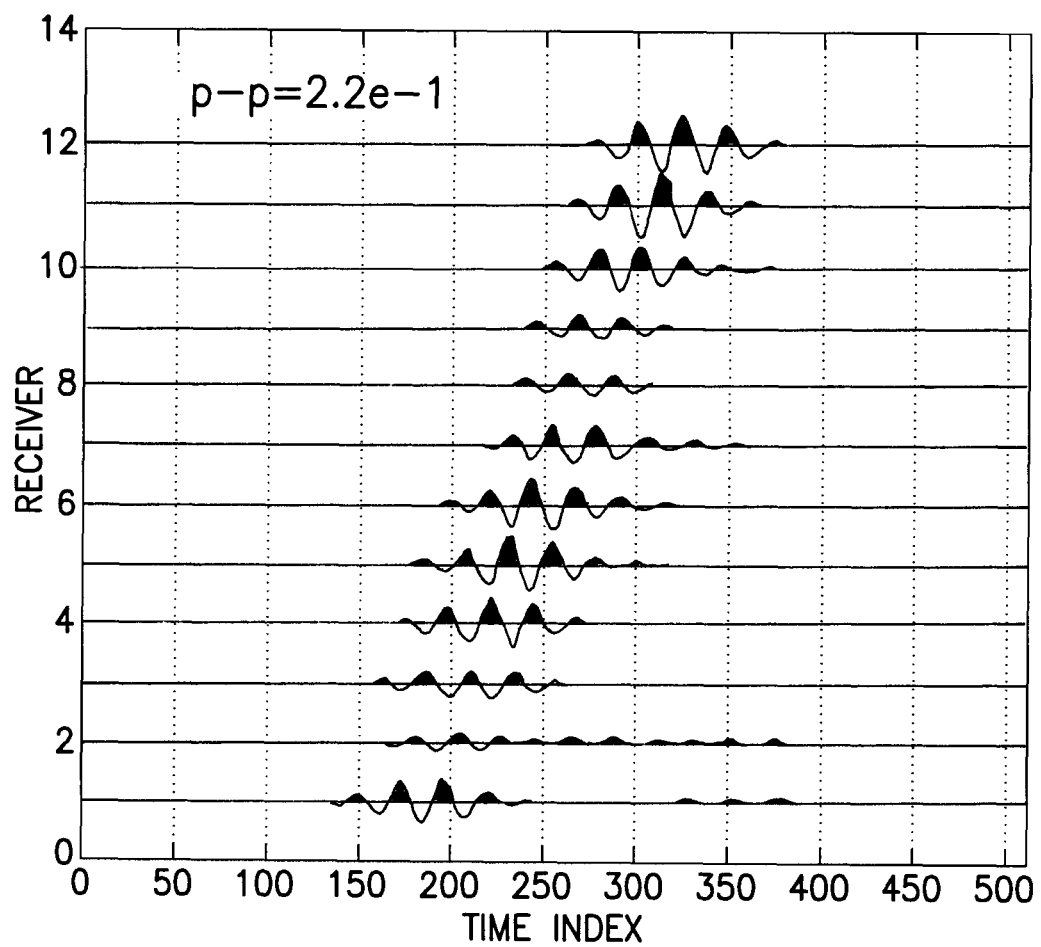
FIG. 7 illustrates noisy data in a band containing two time overlapping modes.
Figure 8:
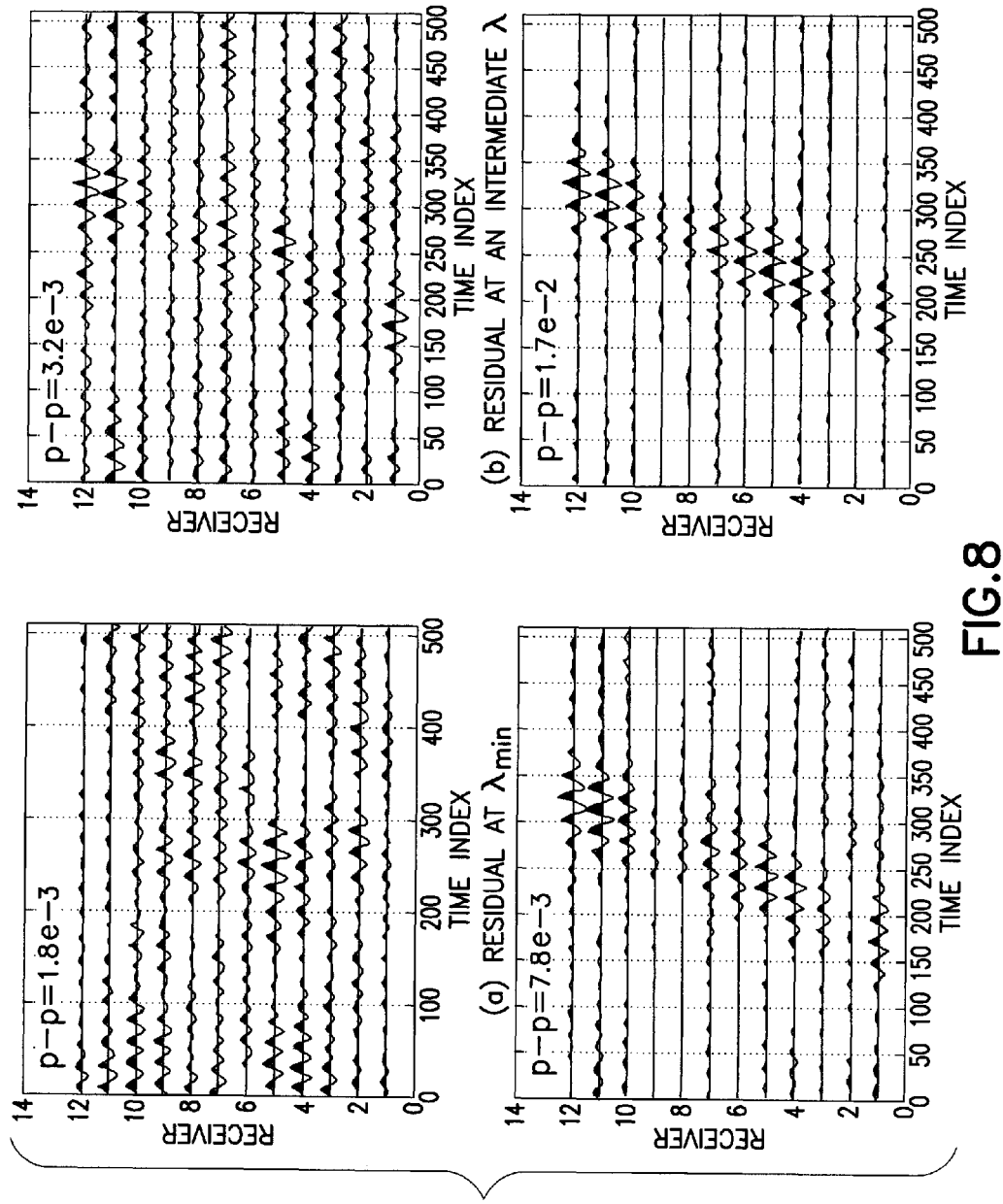
FIG. 8 illustrates an example of the behavior of the residual as a function of $\lambda$. Note how the mode leakage occurs into the residual as we increase $\lambda$. The KS test is used to detect changes in the distribution of the residuals as a function of $\lambda$.

Referring to FIGS. 7 and 8, regarding the issue of selection of the regularization parameter λ, in one embodiment tests are used between the distribution of residuals to select the regularization parameter λ in the optimization problem $OPT_1$. There are essentially two roles played by the $_1l_2$ penalty in this context. The first role is that of general regularization of the solution where due to ill-conditioning of the matrix Φ the noise can get amplified. The second role is that of model order selection, which is essentially related to selection of the sparsest (and correct) basis for signal representation. In the context of finding sparse solutions these two aspects go hand in hand. Note, for example, that at a very low value of λ, the solution to $OP_{T1}$ comes close to the Least Squares (LS) solution. This results in over-fitting of the data and the residual is close to zero. Due to ill-conditioning of the matrix Φ the noise contribution to the solution gets amplified and one observes many spurious peaks in the solution support. Note also that as λ is increased the $_1l_2$ penalty kicks in, allowing less degrees of freedom for data fitting, thereby combating noise and reducing the spurious peaks in the solution. Due to the sparsity imposed by the $_1l_2$ penalty, at a certain λ one hits the sparse signal subspace in the dictionary. However, due to shrinkage in the solution implied by the $_1l_2$ penalty signal leakage occurs into the residual. This implies that as λ is increased (varied) the distribution of the residual changes. Finally, at very high values of λ there is no data fitting and the solution is driven to zero. Therefore, at high values of λ the distribution of the residual converges to the distribution of the data.

The observations described above support a strategy for selecting the regularization parameter by varying λ over a range and detecting changes in distribution of the residuals and selecting an operating λ that mitigates noise and minimizes the signal leakage into the residual while still finding the right signal subspace. A corresponding step (1208) is shown in FIG. 12. In one embodiment the Kolmogorov-Smirnov (KS) test (W. Feller, "On the Kolmogorov-Smirnov limit theorems for empirical distributions," *Annals of Mathematical Statistics*, vol. 19, p. 177, 1948) between empirical distributions of the residuals is used to detect these changes and find an operating range of λ. Given a data sample of the residual $R_1, \ldots, R_i, \ldots, R_{N_S}$, where $N_S = N_f M$ is the number of samples, the empirical cumulative distribution function can be defined as follows:

$$CDF(r) = \frac{1}{N_S} \sum_{i=1}^{N_S} 1_{R_i \le r} \quad (21)$$

Then the KS test statistic for CDF(r) with respect to a reference distribution $CDF_{ref}(r)$ is given by the supremum of the difference of the cumulative distribution functions:

$$D = \sup_r |CDF(r) - CDF_{ref}(r)| \quad (22)$$

The properties of the KS test statistic D, its limiting distribution and the asymptotic properties can be found in (W. Feller, "On the Kolmogorov-Smirnov limit theorems for empirical distributions," *Annals of Mathematical Statistics*, vol. 19, p. 177, 1948). Essentially the KS statistic is a measure of similarity between two distributions. In order to apply the KS-test the steps shown in TABLE A are performed.

STEP 1. Pick an increasing sequence of the regularization parameter $\Lambda = \lambda_1 < \lambda_2 < \ldots < \lambda_n$. In practice it is sufficient to choose this sequence as $\Lambda$=logspace $(a_0, a_1, n)$, $a_0, a_1 \in R$. This choice implies $\lambda_1 = 10^{a_0}$ and $\lambda_n = 10^{a_1}$.

STEP 2. Find the sequence of solutions $\hat{x}_\lambda$, $\lambda \in \Lambda$ and sequence of residual vectors $R_\lambda = Y - \Phi \hat{x}_\lambda$. Denote the empirical distribution of residuals w.r.t. the solution $X_\lambda$ by $CDF_\lambda(r)$ where r denotes the variable for residual.

STEP 3. Conduct KS tests between the residuals—
   3a. Choose two reference distributions, viz., $CDF_1(r)$ corresponding to the minimum value $\lambda_1$ of regularization parameter and $CDF_n(r)$ corresponding to the maximum value $\lambda_n$ of the regularization parameter.
   3b. Find the sequence of KS-test statistics $D_{i,n} = \sup_r |CDF_n(r) - CDF_i(r)|$, i=1, 2, ..., n and the corresponding p-value sequence $P_{i,n}$. Similarly find the sequence of KS-test statistics $D_{i,1} = \sup_r |CDF_1(r) - CDF_i(r)|$, i=1, 2, ..., n and the corresponding p-value sequence $P_i$,1.

STEP 4. Plot the sequences $D_{i,n}$ and $D_{i,1}$ as a function of $\lambda_i$. The operating say λ* is then taken as the point of intersection of these two curves. A similar operating point can also be obtained by choosing the intersection point of the p-value sequences $P_{i,n}$ and $P_{1,i}$.

Figure 9:
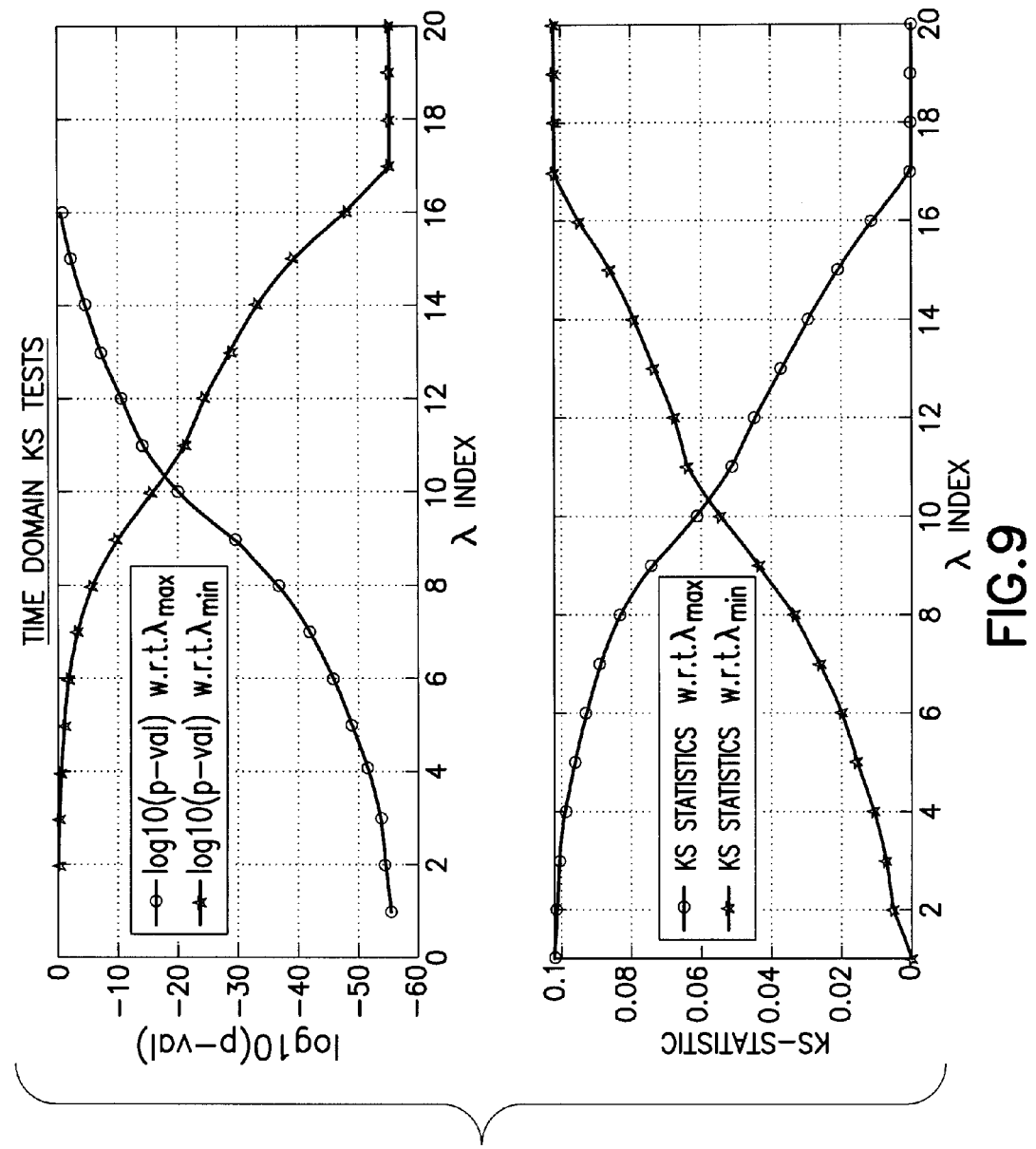
FIG. 9 illustrates an example of the KS test statistic sequence and the p-value sequence for determining the operating $\lambda$.

The intersection point of the test curves qualitatively signifies the tradeoff between over-fitting and under-fitting of the data. In addition, note that as the solution sequence $\hat{x}_\lambda$ starts hitting the right signal subspace in the over-determined basis the rate of change of distribution of the residual as implied by the change in the test statistic, is more rapid due to mode leakage into the residual. In particular it is possible to choose an entire range of λ around the point of intersection. The solutions for this range of λ exhibit stability in terms of getting to the right signal support. For the problem at hand the KS tests can be performed between residuals either in the frequency domain or in the time domain. If the modes are time compact, as is often the case, it is useful to compare the distributions of the residuals in the space-time domain. An example of the KS test-curves for distribution of residuals in time domain and the corresponding operating range of λ is shown in FIG. 9. It is also possible to develop a similar test for changes in the distribution of the signal support of X as a means to select a suitable value for the regularization parameter.

Figure 10:
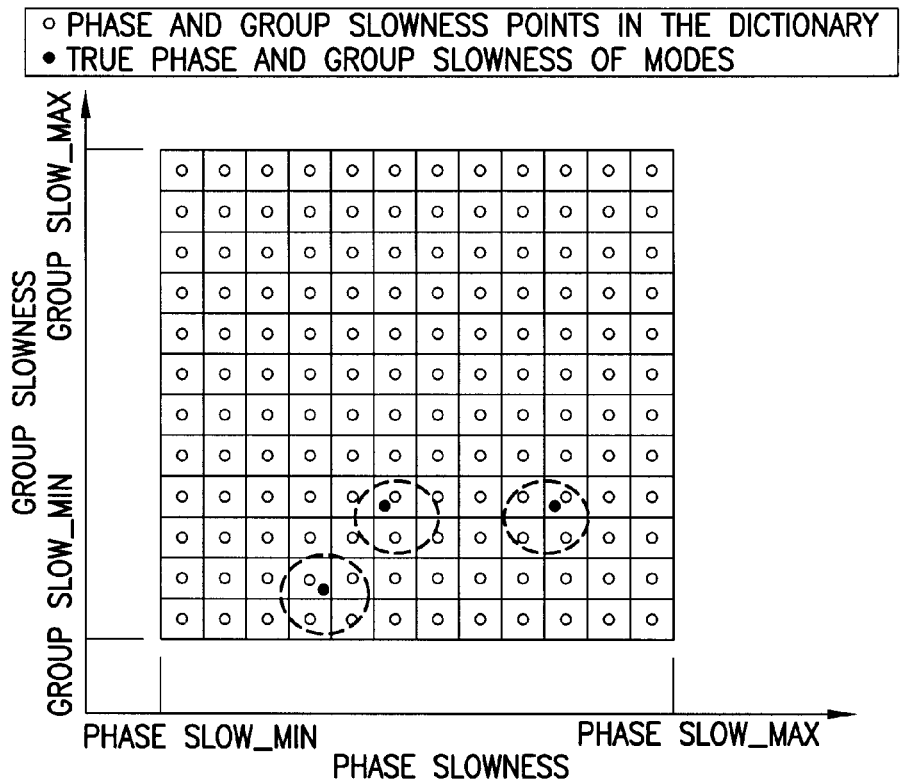
FIG. 10 is a schematic representation of the discretization of the parameter space of phase and group slowness in a band and the mismatch of the dictionary with respect to the true modes in the data.

Another issue to be considered is dictionary mismatch with the underlying true parameter values, i.e., the true modes might not be captured by the elements in the dictionary used. A schematic depiction of the dictionary mismatch with respect to the true modal dispersion is shown in FIG. 10.

Figure 11:
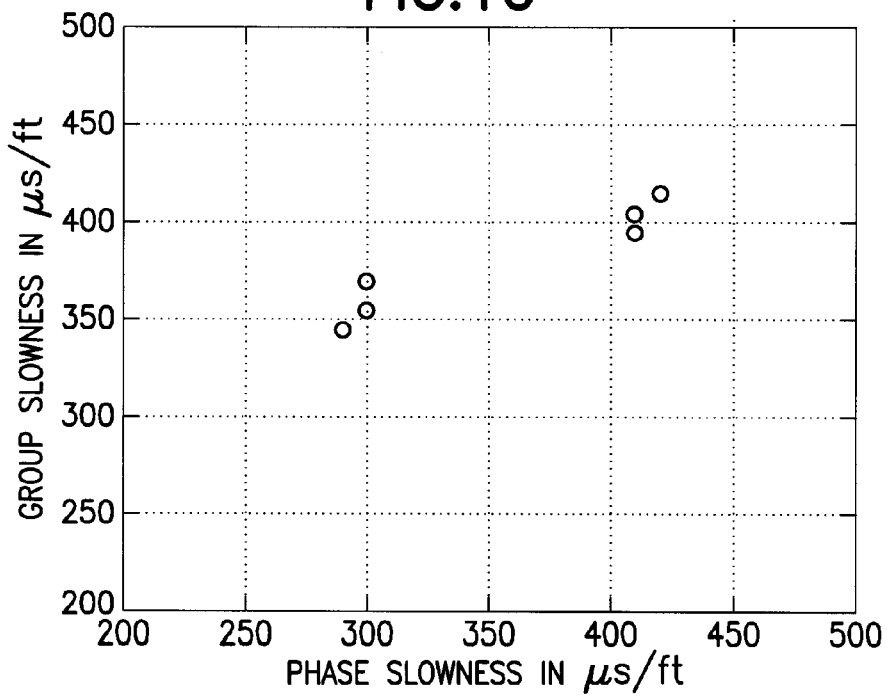
FIG. 11 illustrates an example of the mode clusters in the phase and group slowness domain due to dictionary mismatch corresponding to the 6 largest peaks in the modulus image.

Recall $S_F$ as the true signal in band F as given by equation 12 and let $\hat{S}_F$ be the best and unique $l_2$ approximation to $S_F$ in the constructed over-complete dictionary $\Phi$. Then let $\hat{x} \in \mathbb{C}^{N_f \cdot N \times 1}$ denote the coefficient vector that synthesizes the signal: $\hat{S}_F = \Phi \hat{x}$. Consequently, given $\epsilon > 0$, there exists an $N_\epsilon$ and a quantization of the slowness parameter domain (phase and group slowness) such that $$\|\hat{S}_F(N_\epsilon) - S_F\| \leq \epsilon, \quad (23)$$

i.e. under appropriate quantization, the signal can be well represented in the over-complete basis. This mismatch can then be modeled as an additive error, $$Y = \Phi x + \underbrace{(S_F - \hat{S}_F(N_\epsilon)) + W}_{\tilde{W}}, \quad x \in \mathbb{C}^{N_f \cdot N \times 1} \quad (24)$$

where now the coefficient vector $x$ $\hat{x} \in \mathbb{C}^{N_f \cdot N \times 1}$ corresponds to the representation for the approximate signal $\hat{S}_F$. Thus, in the presence of dictionary mismatch the problem of dispersion extraction maps to that of finding the dispersion parameters of the best approximation to the signal in the over-complete basis of broadband propagators. Sparsity in the number of modes in $S_F$ still translates to sparsity in the representation of the approximation $\hat{S}_F$ in the over-complete basis $\Phi$ and the sparse reconstruction algorithm $OPT_1$ is still employed for dispersion extraction. However, this affects the model order selection and dispersion estimates. In order to understand this in the current context, consider the modulus image, MI, in the dispersion parameter space:

$$MI(x)(i,j) = \|X(:, i+j \cdot (N_1-1))\|_2 \quad (25)$$

whose (i,j)th element comprises the $l_2$ norm of the column of X (reshaped matrix of x) corresponding to the ith value of the phase slowness and jth value of the group slowness. Note that the support of the modulus image corresponds to the broadband signal support and the corresponding dispersion parameters can be read from the image. A corresponding step (1210) is shown in FIG. 12. Now the result of the dictionary mismatch with respect to the true dispersion parameters of the modes is a clustered set of peaks in the modulus image described above. This clustered set of points corresponds to the set of phase and group slowness points that are closest to the true phase and group slowness points. This is due to approximate signal representation of the true signal in the over-complete basis, obtained in the solution to the optimization problem $OPT_1$. The mode clusters can also be formed if there is a high level of coherence between the broadband basis elements. An example of such clustering around the true values of phase and group slowness is shown in FIG. 11.

In order to perform cluster analysis for model order selection, in accordance with an embodiment of the invention, a k-means algorithm is used (See H. Spath, "Cluster Dissection and Analysis: Theory, FORTRAN Programs, Examples," translated by J. Goldschmidt, Halsted Press, 1985, 226 pp.) for accomplishing this. A corresponding step (1212) is shown in FIG. 12. The steps for carrying this out are listed in Table B below:

STEP 1. Pick a certain number of peaks say Np corresponding to the largest values in ModIM(X).
STEP 2. Perform a k-means clustering of the peak points in the phase and the group slowness domain.
STEP 3. Declare the resulting number of clusters as the model order.

STEP 4. Mode consolidation—
4a. The mode spectrum corresponding to each cluster is obtained by summing up the estimated coefficients corresponding to the points in the cluster.
4b. The corresponding dispersion estimates are taken to be the average over the dispersion parameters corresponding to the cluster points.

Having described a framework for dispersion extraction in terms of reconstruction of sparse set of features in an over-complete basis of broadband propagators in the f-k domain, and developed the algorithmic tools for solving the problem posed in this framework, viz., (a) the $l_1 l_2$ penalized reconstruction algorithm $OPT_1$; (b) the KS tests between sequences of residuals in the time domain and; (c) mode clustering for model order selection in the quantized parameter space of phase and group slowness, a flowchart showing various steps of a dispersion extraction methodology in the f-k domain in accordance with an embodiment of the invention is shown in FIG. 12. After producing output in band F (1214), the steps are repeated for each other band as indicated by step (1216).

It should be noted that the methodology does not rely upon time information. In particular, no use is made of the fact that the modes are often time compact. In this context in document "S. Aeron, S. Bose, and H. P. Valero, "Automatic dispersion extraction using continuous wavelet transform," in *International Conference of Acoustics, Speech and Signal Processing*, 2008" a broadband dispersion extraction method was proposed, viz., Exponentially Projected Radon Transform (EPRT) using the continuous wavelet transform (CWT) that exploits the time compactness of modes. EPRT was designed to work with signals comprising either a single mode or multiple modes separated on the time frequency plane and was shown to give good performance in those cases. Due to time windowing the noise and the interference is reduced resulting in better dispersion estimates. However, that approach is not suitable for multiple overlapping modes. In contrast, the illustrated approach in the f-k domain has been shown to be robust to presence of time overlapped modes. However, unlike EPRT this approach makes no use of time information and in particular this makes the group slowness estimates sensitive to noise and interference. Therefore, in order to make use of time compactness of the modes the broadband dispersion extraction method in the f-k domain is combined with the EPRT type broadband dispersion extraction in the space-time domain. The CWT of the array data is used in order to retain the time information in this context. Initially, the dispersion parameters in the CWT domain are identified. Recall here (a more detailed exposition can be found, for example, see A. Grossmann, R. Kronland-Martinet, J. Morlet. Reading and understanding continuous wavelet transform. *Wavelet, Time-frequency Methods and Phase Space*, Ed. J M Combes, A. Grossmann, P. Tchamitchian, Springer-verlag, Berlin, 1989) that the continuous wavelet transform of a signal s(t) is the scalar product of this signal by the dilated and translated wavelets, given by $$T^b \hat{D}^a [g(t)] = \frac{1}{\sqrt{a}} g\left(\frac{t-b}{a}\right).$$

The CWT C(a,b) of signal s(t) at scale (dilation factor) a and shift (translation) b is given by $$C(a, b) = \frac{1}{\sqrt{a}} \int s(t) g^* \left( \frac{t-b}{a} \right) dt \quad (26)$$

$$= \int_{-\infty}^{\infty} G^*(af) e^{i2\pi bf} S(f) df \quad (27)$$

where G(f) is the Fourier transform of the analyzing (mother) wavelet g(t) and S(f) is the Fourier transform of the signal being analyzed. The analyzing mother wavelet g(t) is chosen to satisfy some admissibility condition. For the sake of exposition first consider a single mode. Then under the complex exponential model of equation 5 (and ignoring attenuation), the CWT coefficients at scale a and time shift b of the received waveform at sensor l, is given by, $$C_l(a, b) = \int_{-\infty}^{\infty} G^*(af) S_1(f) e^{i2\pi(bf - z_l k_m(f))} df \quad (28)$$

Figure 13:
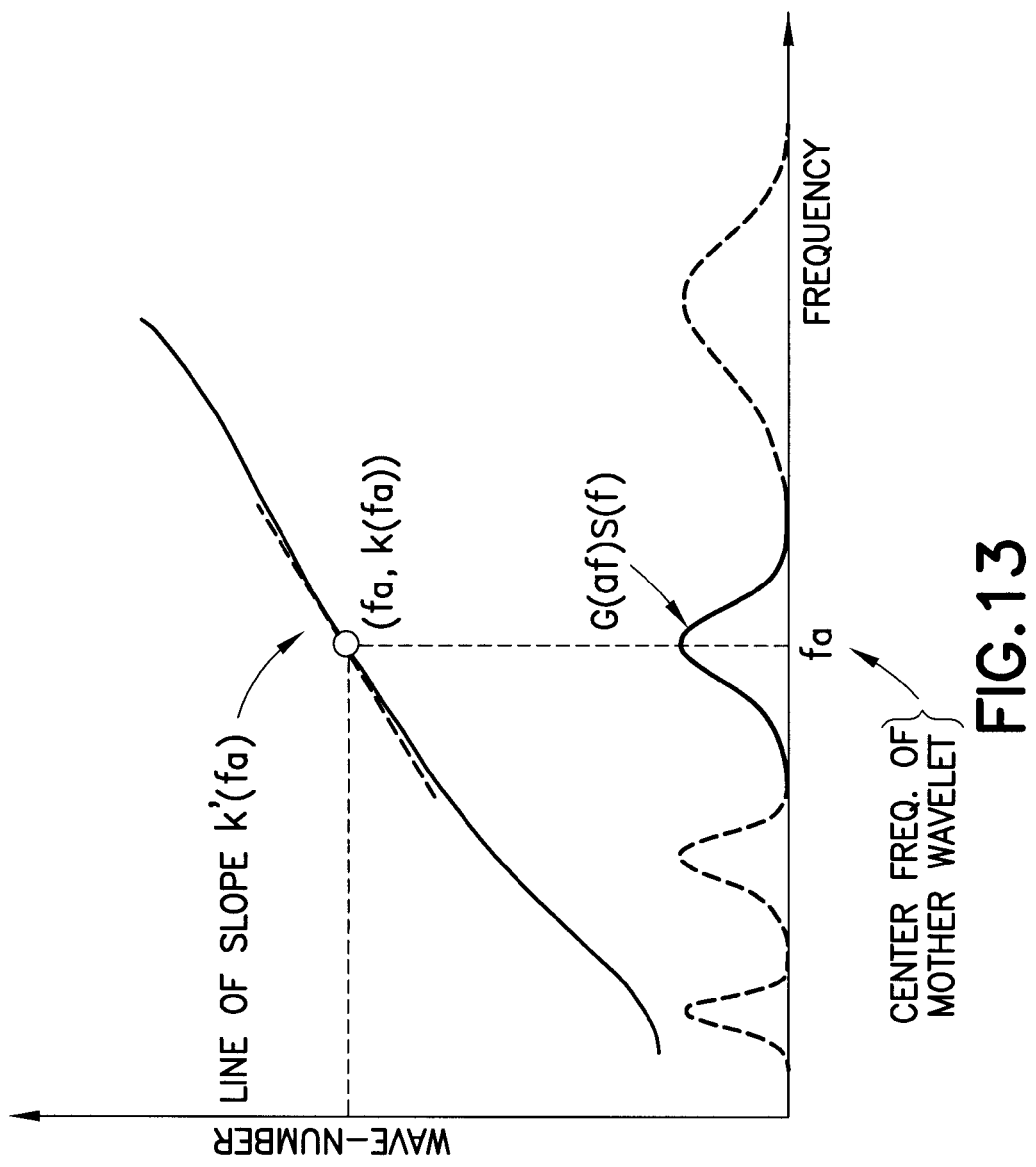
Figure 14:
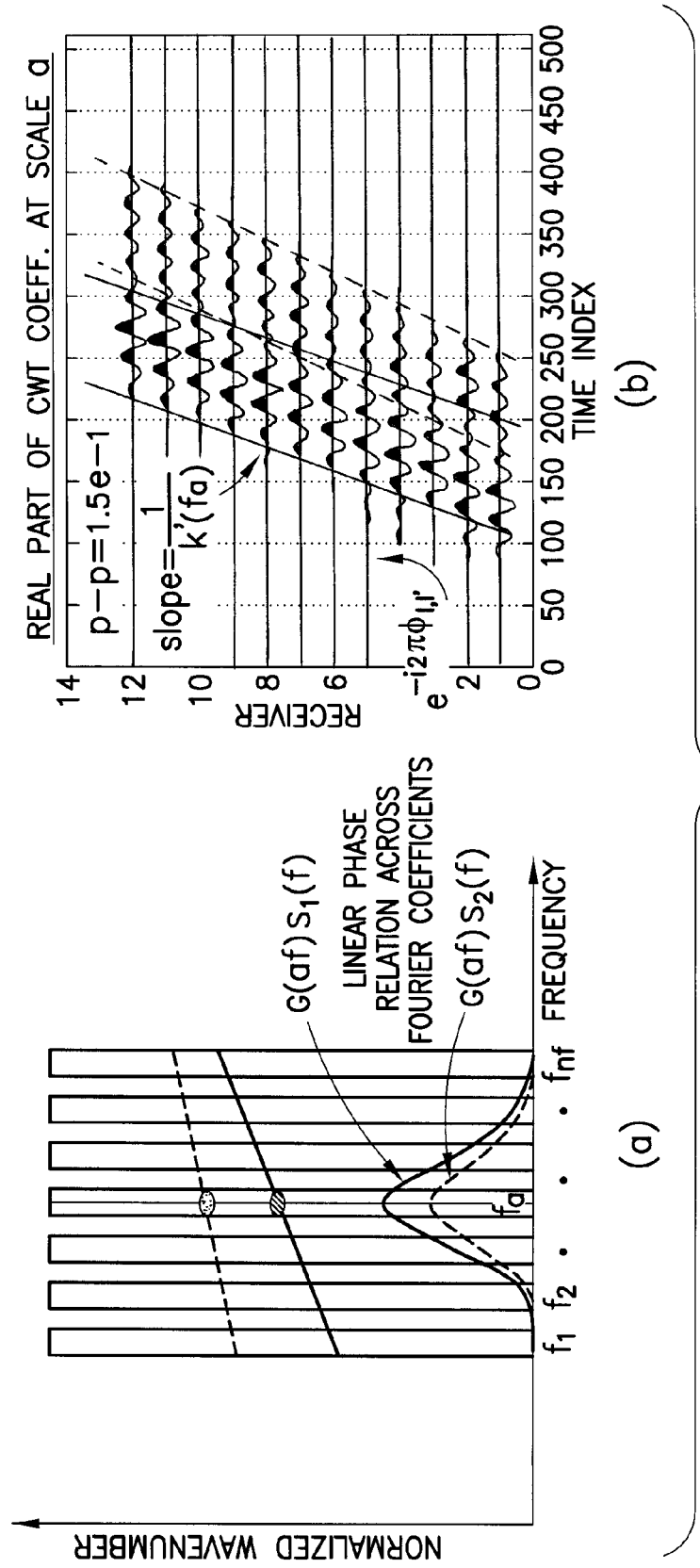
FIG. 14 illustrates a combination of the space-time and frequency-wavenumber processing for dispersion extraction using CWT (depicting the (a) f-k domain and (b) time domain characteristics of the CWT coefficients in terms of the propagation parameters at a given scale).

Assuming that a first order Taylor series approximation holds true in the effective bandwidth of the analyzing wavelet around the center frequency $f_a$ of the analyzing wavelet, see FIG. 13, the CWT coefficients at scale a obey the following relationship, $$C_l(a, b) = e^{-i2\pi \delta_{l,l'} (k(f_a) - f_a k'(f_a))} C_{l'}(a, b - \delta_{l,l'} k'(f_a)) \quad (29)$$

$$= e^{-i\phi_{l,l'} \phi_a} C_{l'}(a, b - \delta_{l,l'} k'(f_a))$$

where $\delta_{l,l'} = z_l - z_{l'}$ denotes the inter-sensor spacing between sensor l and l' and where $$\frac{\phi a}{2\pi} \doteq k(f_a) - f_a k'(f_a) = f_a (s^\phi(f_a) - s^g(f_a))$$

is a compensating phase factor. Thus, for a given mode the CWT coefficients of the mode at a given scale undergo a shift according to the group slowness across the sensors with a complex phase change proportional to the difference of the phase and the group slowness. These ideas are depicted in FIG. 14(b). Moreover, take the Fourier transform with respect to the time shift b and obtain a simple exponential relationship $$C_l(a,f) = e^{i2\pi \delta_{l,1}(k(f_a) + k'(f_a)(f - f_a))} C_1(a,f) \quad (30)$$

for all f ∈ 𝓕 a the effective frequency support of the analyzing wavelet at scale a. Thus the same exponential relationship holds for the CWT coefficients in the frequency domain as for the original signal mode with the frequency band now given by the support at scale a of the analyzing wavelet.

Considering now the general multiple mode case and letting $C_l^m(a,b)$ denote the CWT for mode m at sensor l, from the linearity of the CWT, the CWT coefficients of the data is simply the superposition of the coefficients of each mode, i.e., $$C_l(a, b) = \sum_{m=1}^{M} C_l^m(a, b) \quad (31)$$

The following observations can be made regarding the CWT transform of the modes at a given scale:

Time compactness of mode m implies time compactness of the CWT coefficients $C_l^m(a,b)$ at each scale. The time-frequency support of the modes in the CWT domain obeys the time-frequency uncertainty relation corresponding to the mother wavelet used—at higher frequencies (smaller scales) the time resolution is sharp but the frequency resolution is poor and vice-versa.

Time compactness in turn implies a linear phase relationship across frequencies f ∈ 𝓕 a in the coefficients of the mode spectrum $C_l^m(a,f)$ of the CWT data $C_l^m(a,b)$ at any sensor l and where ⌗ is the effective bandwidth of the analyzing wavelet at scale a.

Equations 30 and 31 indicate that the same exponential relationship holds for the CWT coefficients at each scale a in the frequency domain as for the original signal with the frequency band now given by the support at that scale of the analyzing wavelet. In particular, $Y_l(a,f)$ denotes the Fourier transform at frequency f of the CWT coefficients at scale a of the waveform received at sensor l and $Y_a(f)$ is the corresponding vector consisting of $Y_l(a,f)$ for all sensors, then we see that $Y_a(f)$ can be represented in terms of a sum of exponential broadband propagators model very similar to equations 10 and 12.

Figure 15:
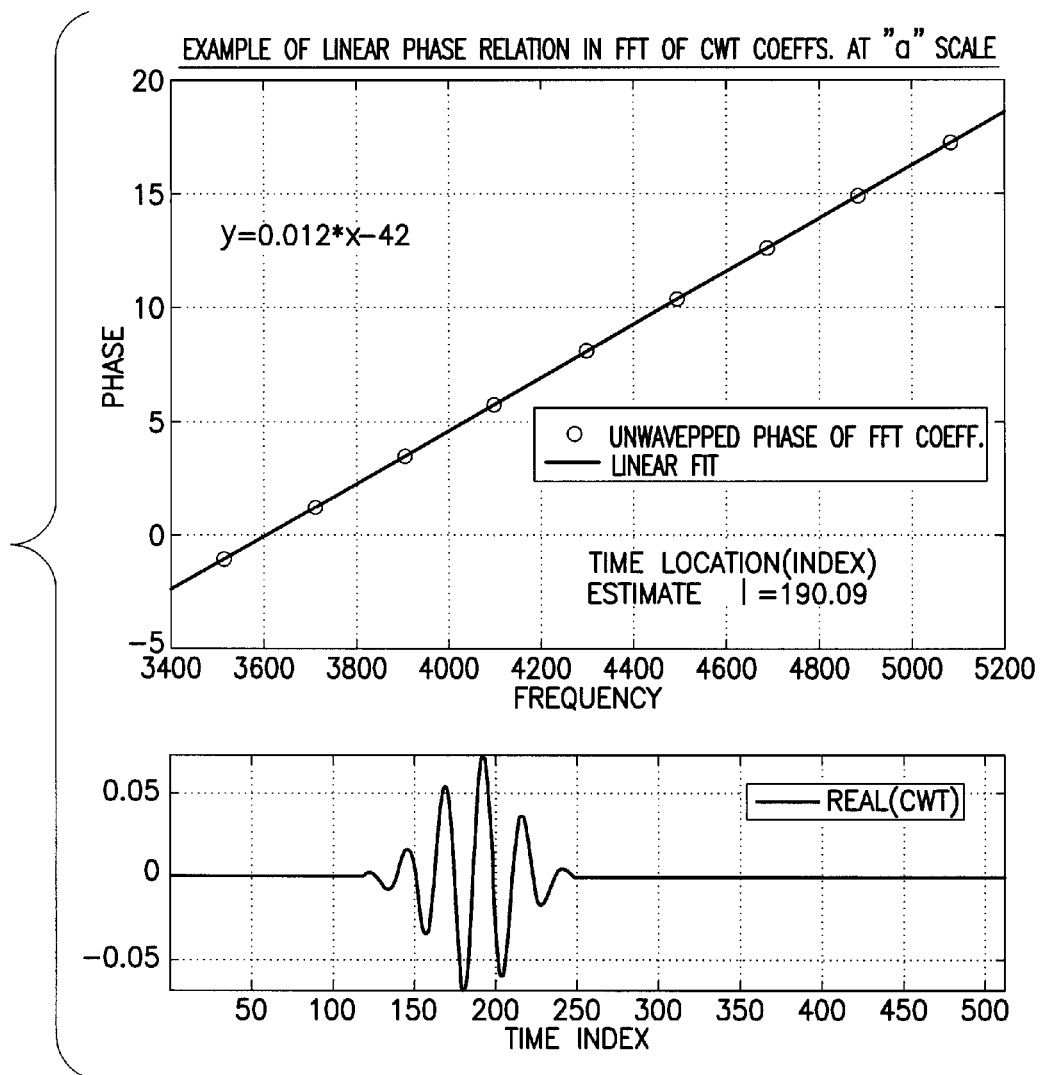
FIG. 15 illustrates an example of implication of time compactness of the CWT coefficients at a given scale at one sensor on the phase of the FFT coefficients in the band.

These ideas are depicted in FIGS. 14(a), (b) and FIG. 15. The first observation together with the dispersion relation of equation 29 in the CWT coefficients, formed the basis of EPRT processing as proposed in S. Aeron, S. Bose, and H. P. Valero, "Automatic dispersion extraction using continuous wavelet transform," in *International Conference of Acoustics, Speech and Signal Processing*, 2008.

The third observation above indicates that the broadband dispersion extraction methodology in the f-k domain described in the previous section can be extended in a straightforward manner to the CWT coefficients. One can do the processing at each scale and then combine the estimated curves across scales to obtain the entire dispersion curve. One can also incorporate time compactness of modes by imposing a linear phase constraint in the broadband f-k processing. However, this imposes severe computational requirements and is not feasible in general.

Figure 19:
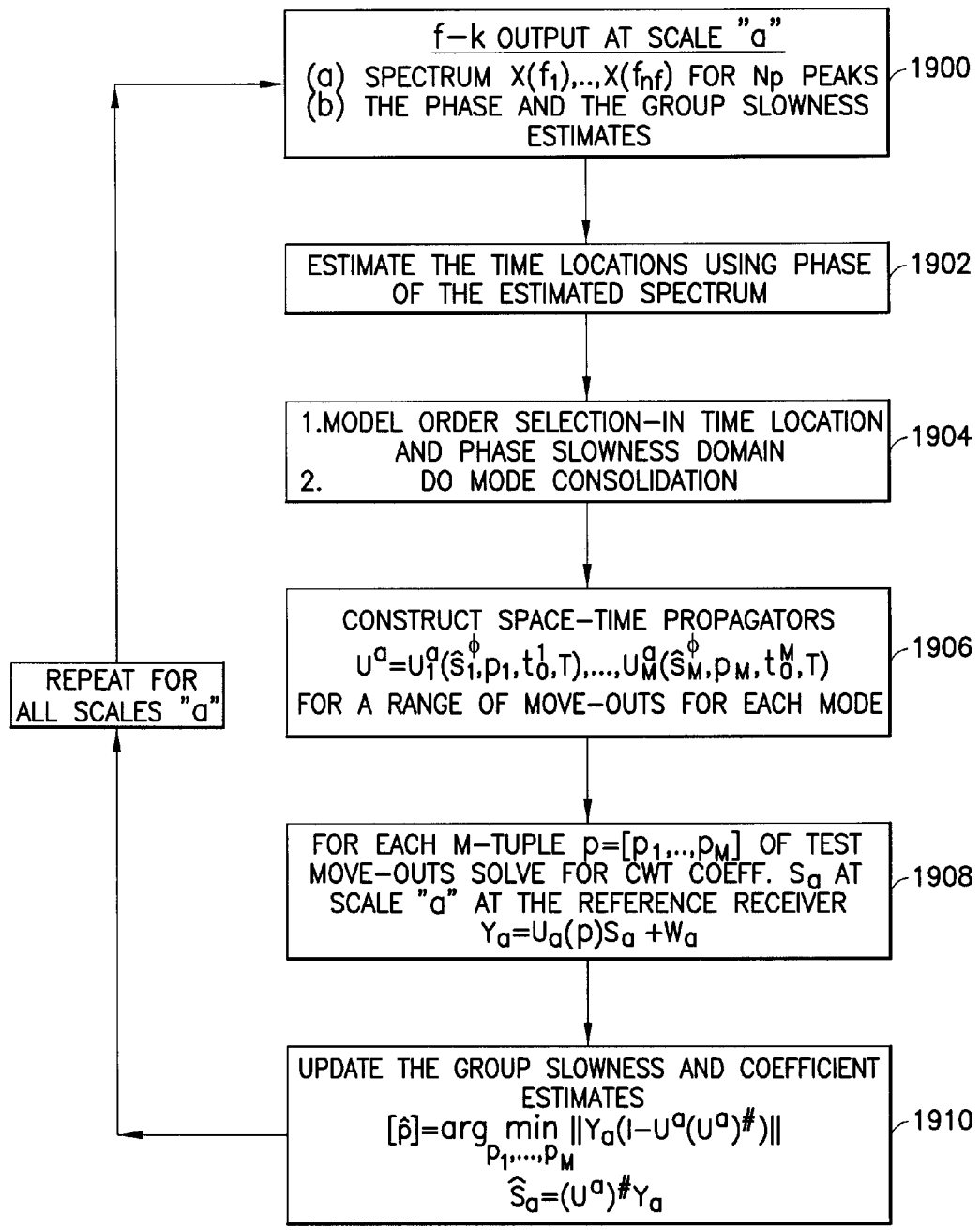
FIG. 19 illustrates the flow of the processing in the space time domain processing the output of the broadband processing in the f-k domain as applied to the CWT coefficients at a given scale.

In accordance with one embodiment of the invention a joint method for dispersion extraction in the CWT domain that utilizes the broadband multiple mode extraction methodology in the f-k domain and the time compactness of modes in the space-time domain in a manner similar to the EPRT algorithm is used. At a given scale, start with the broadband f-k processing of the CWT coefficients and obtain preliminary estimates of the phase and group slowness at that scale, and then follow the same set-up and approach described above. The difference is that while constructing the broadband propagators as in equation 13, a reference location $z_0$ at the centroid of the sensor array is chosen, i.e., replace the $z_l$ by $z_l - z_0$ in equation 13. This is done to facilitate the time processing as it decouples the errors in the group slowness estimated from the time location estimate obtained below. A corresponding step (1900) is shown in FIG. 19.

This f-k domain processing is followed by a model order selection and a mode consolidation step (1902, FIG. 19) which is modified to include estimates of time location. In contrast with the broadband f-k processing described earlier, the model order selection is now done based on clustering in the phase slowness and time location domain. The reason for this is that time location estimates obtained from the broadband processing in f-k domain are more robust than the group slowness estimates. The fact that time compactness of the modes implies a linear phase relationship across frequency in the mode spectrum is exploited to obtain the time location estimates. Based on the linear phase relationship one can obtain estimates of the time location of the modes at scale a from estimates of the mode spectrum at the reference sensor by fitting a straight line through the unwrapped phase of the estimated mode spectrum in the band. The slope of this line is related to the index of the time location estimate of the mode via the relationship $$\hat{t}_0 = \frac{\text{slope}}{2\pi \cdot T_s \cdot 10^{-6}} \quad (32)$$

where slope is measured in radians/Hz and $T_s$ is the sampling time interval in μs.

The steps for time location estimation and model order selection are listed in Table C below.

STEP 1. Pick a certain number of peaks say Np corresponding to the largest values in ModIM(X).

STEP 2. Estimate time locations of the modes corresponding to each of these peaks by fitting a straight line through the phase of the mode spectrum coefficients.

STEP 3. Perform k-means clustering in the phase slowness and time location domain.

STEP 4. Declare the resulting number of clusters as the model order (in the band).

STEP 5. Mode consolidation—

5a. The mode spectrum corresponding to each cluster is obtained by summing up the estimated mode spectrum coefficients corresponding to the points in the cluster.

5b. The slowness dispersion estimates are taken to be the average over the slowness dispersion parameters corresponding to the cluster points.

5c. For each consolidated mode the time location estimates are then to be corresponding to the peak of the envelope in the time domain.

Figure 16:
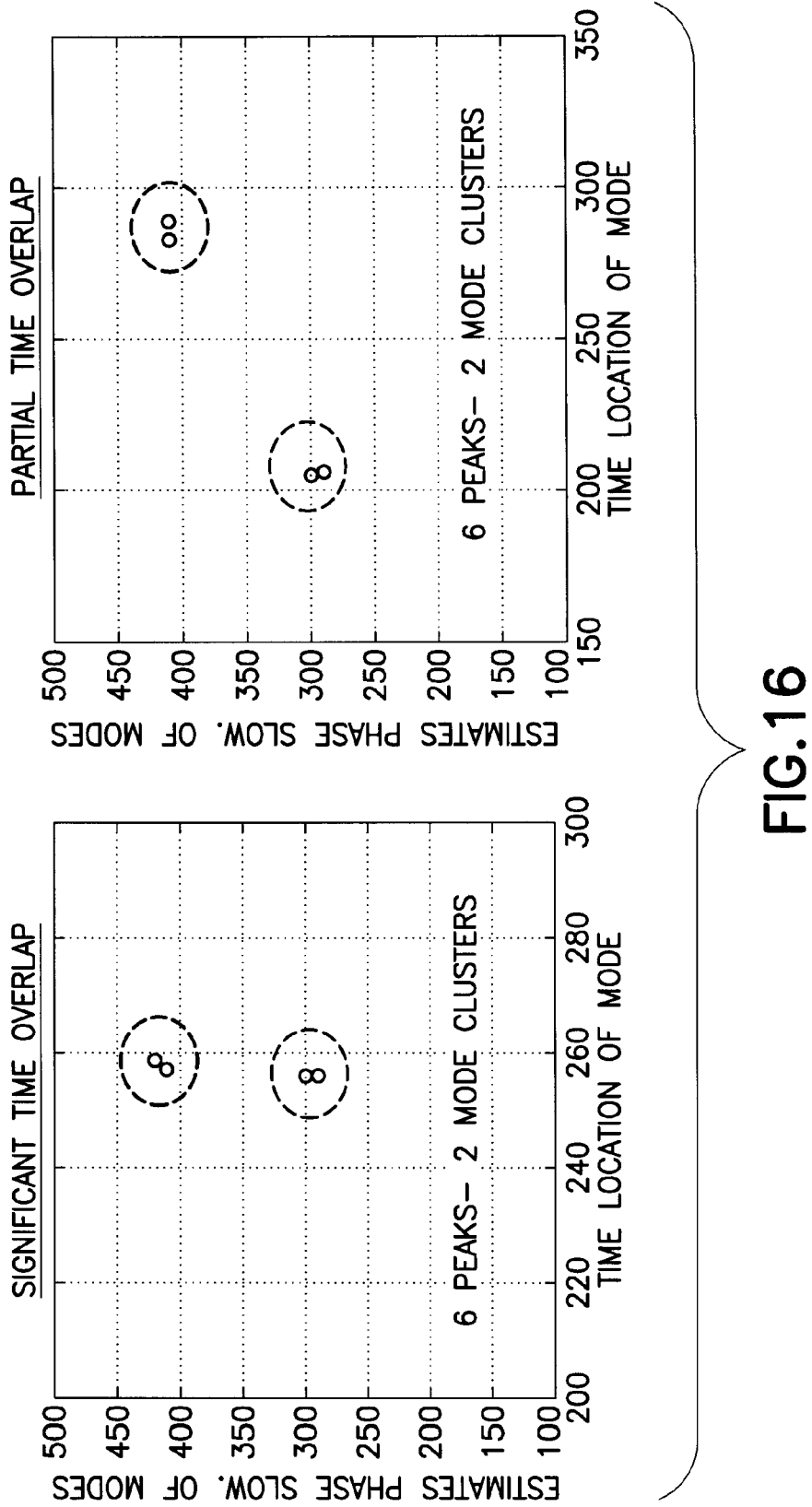
FIG. 16 illustrates an example of mode consolidation and model order selection using the phase slowness and time location estimates.

Examples of mode clustering in the phase slowness and time location domain for a synthetic two mode case for two scenarios of partial time overlap and total time overlap are shown in FIG. 16.

Figure 17:
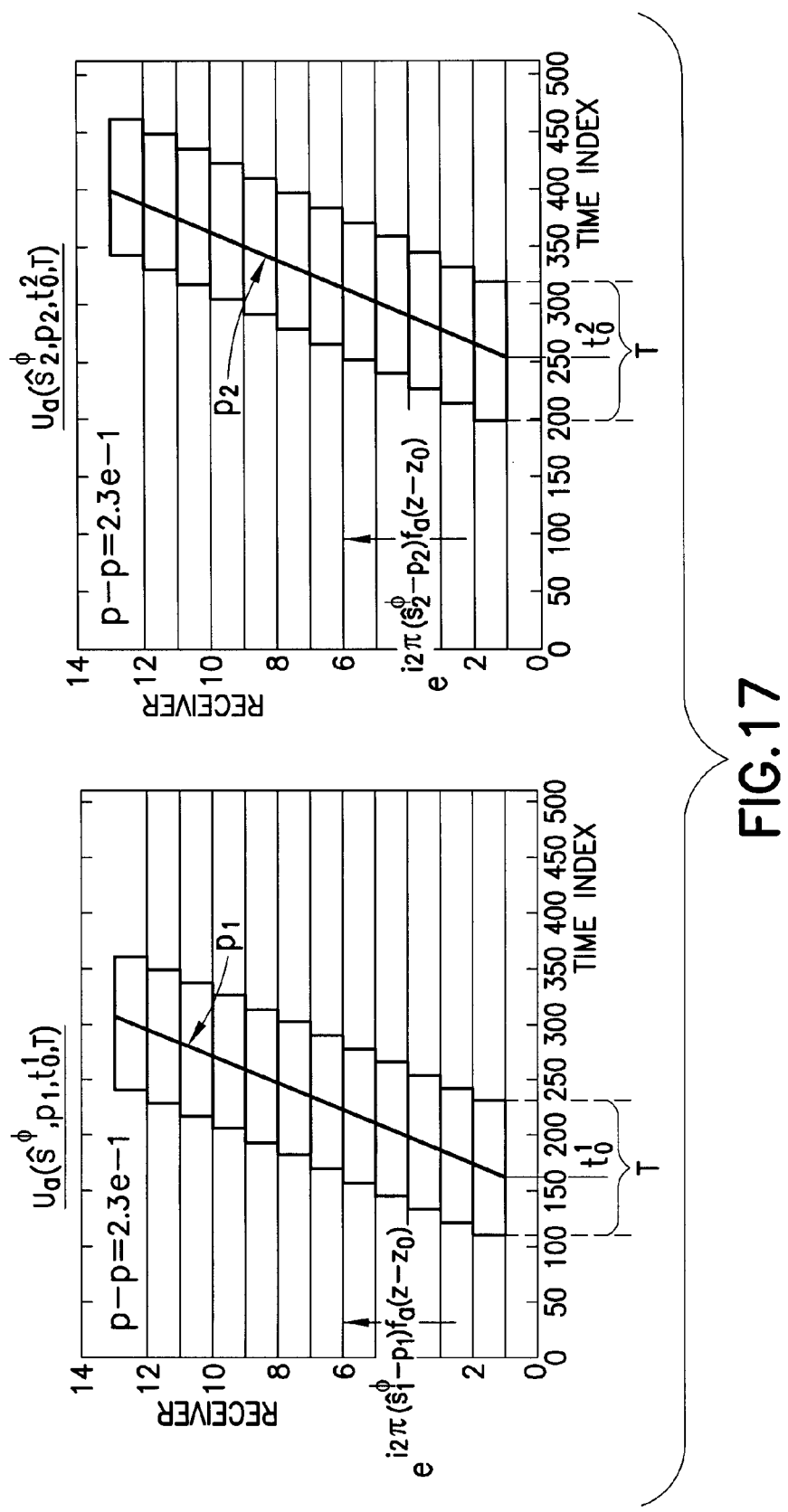
FIG. 17 illustrates the broadband space time propagators in the CWT domain.

Space-time processing of the consolidated modes for refining mode spectrum and group slowness estimates will be described with reference to FIG. 17. Starting with the consolidated modes obtained from the previous steps, a space-time processing refines the mode amplitude spectrum and group slowness estimates. Recall from equation 29 that the CWT coefficients for a mode are related across the sensor array by a time shift corresponding to the group slowness and a phase correction given by the difference of the group and phase slowness. Consequently, broadband propagators in the space-time domain each of which is defined as a time compact window propagating at the group slowness with a complex phase change across sensors in proportion to the difference of the phase and group slowness can be considered. Mathematically, let $u_T(t)$ denote a rectangular window function of width T centered at zero. Then the broadband space time propagator at a scale a can be written as—

$$U^a(s^\phi, s^g t_0, T) = \begin{bmatrix} e^{i2\pi(s^\phi - s^g)f_a(z_1 - z_0)} u_T(t - t_0 + p(z_1 - z_0)) \\ \vdots \\ e^{i2\pi(s^\phi - s^g)f_a(z_L - z_0)} u_T(t - t_0 + p(z_L - z_0)) \end{bmatrix} \quad (33)$$

Let the declared number of modes from f-k processing at scale a be $\hat{M}_a$. Let the corresponding phase slowness estimates be given by $s_m^\phi$ and let the time location estimates be given by $\hat{t}_0^m$ for m=1, 2, . . . , $\hat{M}$. The time window width T for each mode around the time location $t_0^m$ is taken to be the effective time width of the analyzing wavelet at scale a. Picking a range of test moveouts $P_m \in [s_m^g - \Delta_p, s_m^g - \Delta_p]$ for each mode around the estimated group slowness from the f-k processing, for an M tuple of test moveouts form space time propagators using the phase slowness and time location estimates obtained from f-k processing. Examples of broadband space time propagators in the space time domain at a scale for 2 modes are shown in FIG. 17. Then, given the CWT array data $Y_1(a,b)$ at scale a form the following system of equations—

$$Y_a = U_a(p)C_a + W_a \quad (34)$$

where $Y_a = [Y_1(a,b), Y_2(a,b), \ldots, Y_L(a,b)]$ is the array of CWT coefficients of the noisy data at scale a. In the above expression, the matrix $$U_a(p) = [U^a(s_1^\phi, p_1, t_0^1, T), \ldots, U^a(s_M^\phi, p_M, t_0^M, T)] \quad (35)$$

is the matrix of broadband propagators corresponding to an M-tuple of test move-outs corresponding to the M modes. $C_a = [C^1(a,b), \ldots, C^M(a,b)]$ is the collection of CWT coefficients for M modes to be estimated at the reference sensor location $z_0$ in the respective time window of width T around time locations $t_0^1, \ldots, t_0^M$. Note that this is an over-determined system of equations and in order to estimate the CWT coefficients at the test moveout, the minimum mean square error (MMSE) estimate under the observation model is formed. To this end, for each M-tuple define $$e(p_1, \ldots, p_M) = \|Y_a - U_a(p)\hat{C}_a(p)\| \quad (36)$$

$$\hat{C}_a(p) = U_a(p)^\# Y_a \quad (37)$$

where e is the residual error for the M-tuple test moveouts and $(.)^\#$ denotes the pseudo-inverse operation. For updating the group slowness estimates a combinatorial search is performed over all possible M tuples of test moveouts and the combination that minimizes the residual error is selected, i.e., $$\hat{p}_1, \ldots, \hat{p}_M = \arg\min_{p_1, \ldots, p_M} \|Y_a - U_a(p)\hat{C}_a(p)\| \quad (38)$$

Figure 18:
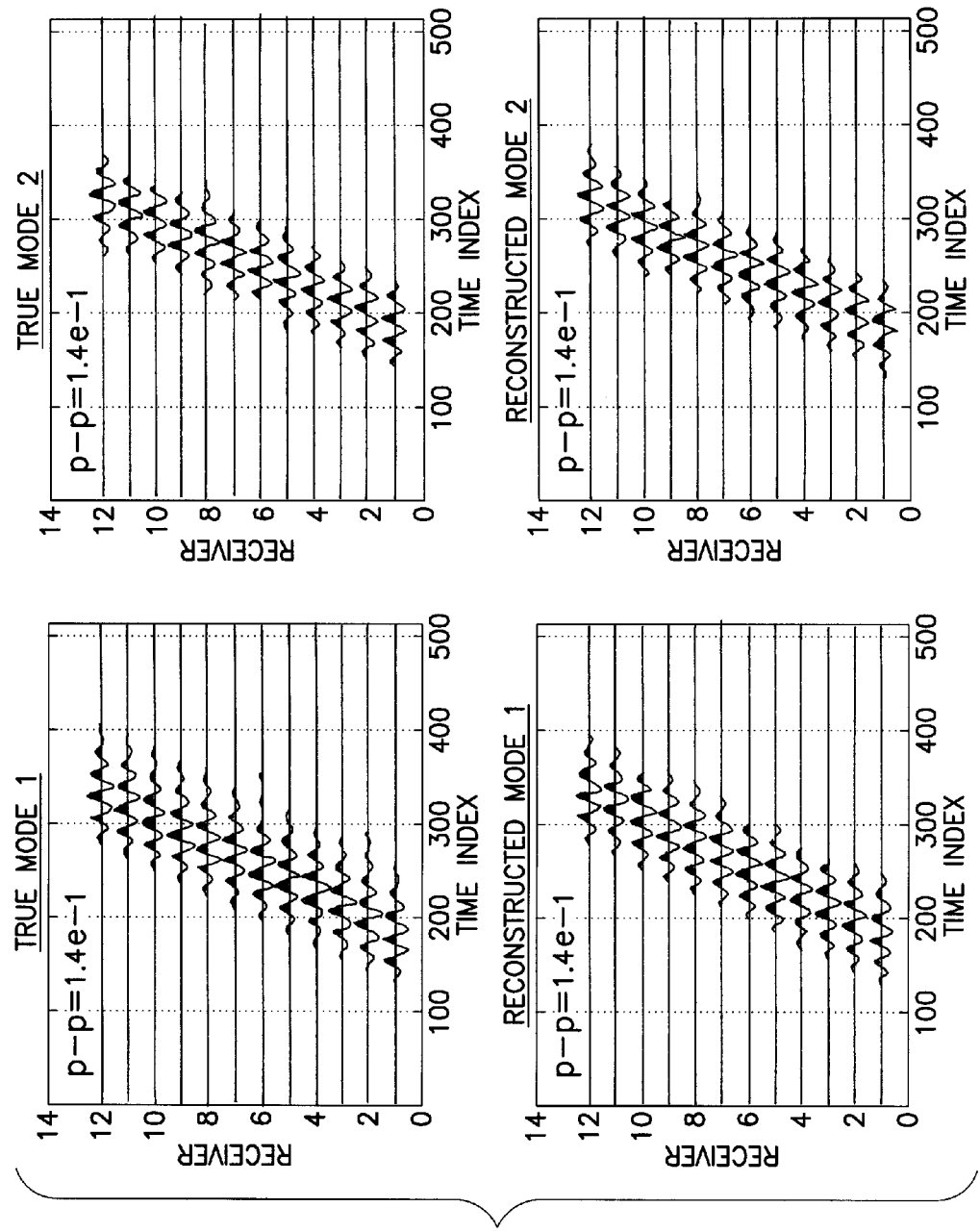
FIG. 18 illustrates the reconstructed CWT coefficients at a given scale for two mode dispersion extraction problem with significant time overlap.

An example of the reconstructed CWT coefficients at a scale is shown in FIG. 18 for the case of significant time overlap.

In view of the above it is possible to describe an overall processing flow in steps. First, choose disjoint or partially overlapping frequency bands with given center frequencies and bands around the center frequencies. Note that there are two choices for this depending on the whether one uses CWT of the data for dispersion extraction or not. With the CWT of the data, the choice of the frequency bands corresponds to the center frequencies of the scales (usually a logarithmic sampling) and the effective bandwidth at those scales. Then, the following steps are performed for each of the bands:

Step 1: Execute a broadband processing in band F—

1a. Construct an over-complete dictionary of space time propagators Φ in band F for a given range of phase and group slowness (see step 1204, FIG. 12) and pose the problem as the problem of finding sparse signal representation in an over-complete basis. In particular solve the optimization problem $OPT_1$.

1b. Pick the regularization parameter $\lambda^*$ in $OPT_1$ using KS-test between residuals, i.e. by executing steps in Table A. Take the corresponding solution $X_{\lambda^*}$ for further processing. (see step 1206, FIG. 12)

Step 2: Model order selection and mode consolidation (1904, FIG. 19)—Depending on whether one utilizes time information or not this step can be done in two ways Model order selection (A)—No use of time localization of modes. Execute steps in Table B. Stop and go to next band.

Model order selection (B)—Use time localization of modes.

Execute steps in Table C. Go to Step 5.

Step 3 (shown as 1906, FIG. 19): For each mode choose a range of move-outs around the group slowness estimates and build space-time propagators using the phase slowness estimates and time location estimates of the modes.

Step 4 (shown as 1908, FIG. 19): For each M tuple of move-outs, $p=[p_1, \ldots, p_M]' \in \mathbb{R}^{M \times 1}$ find estimates $\hat{C}_a$ of CWT coefficients $C_a$ using the relation $Y_a = U_a(p) C_a + W_a$.

Step 5 (shown as 1910, FIG. 19): Update group slowness estimates—

$$\hat{p}_1, \ldots, \hat{p}_M = \arg\min_{p_1, \ldots, p_M} \|Y_a - U_a(p)\hat{C}_a(p)\| \quad (39)$$

and proceed to the next band.

Figure 20:
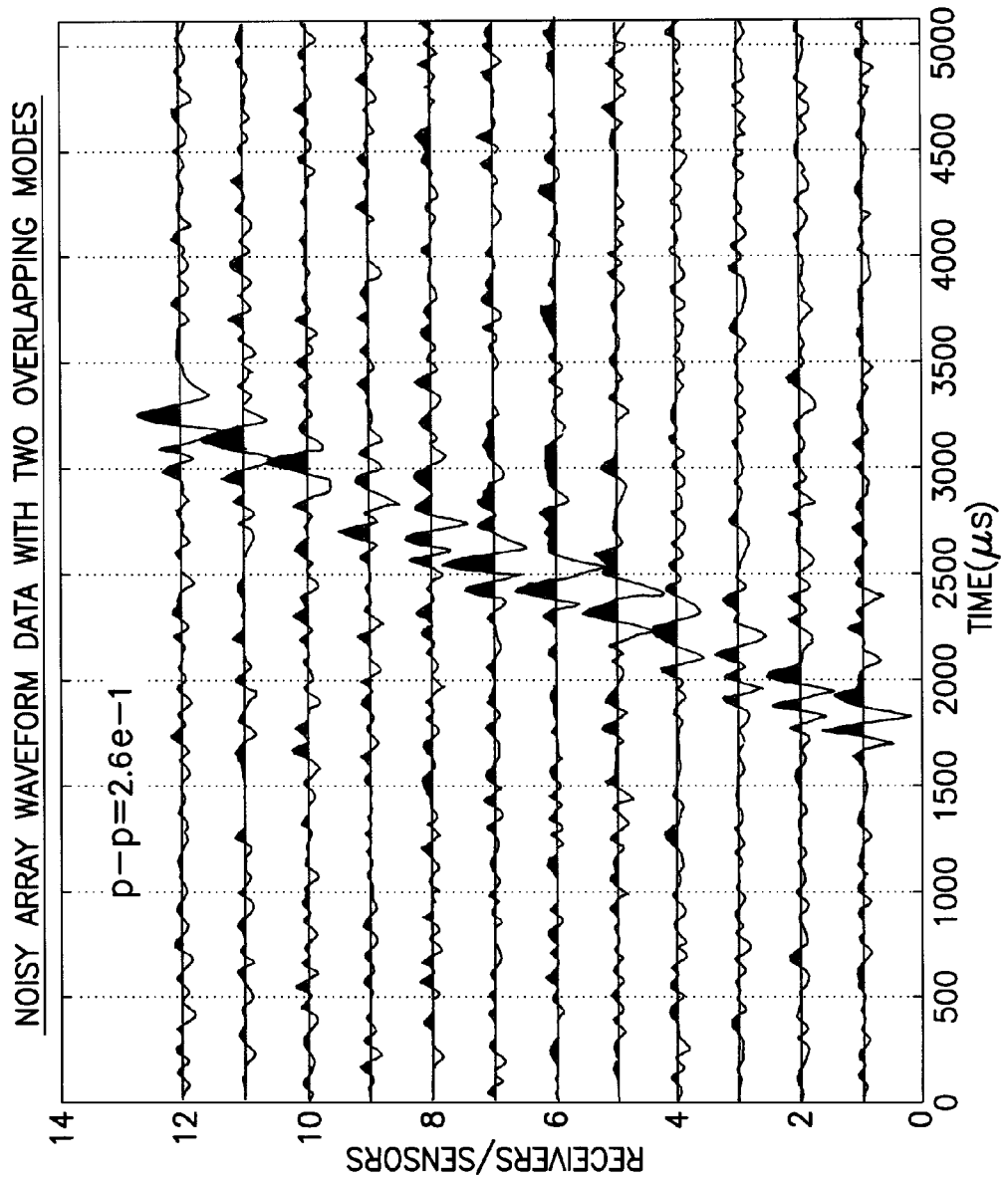
FIG. 20 illustrates an array waveform data with two time overlapping modes.
Figure 21:
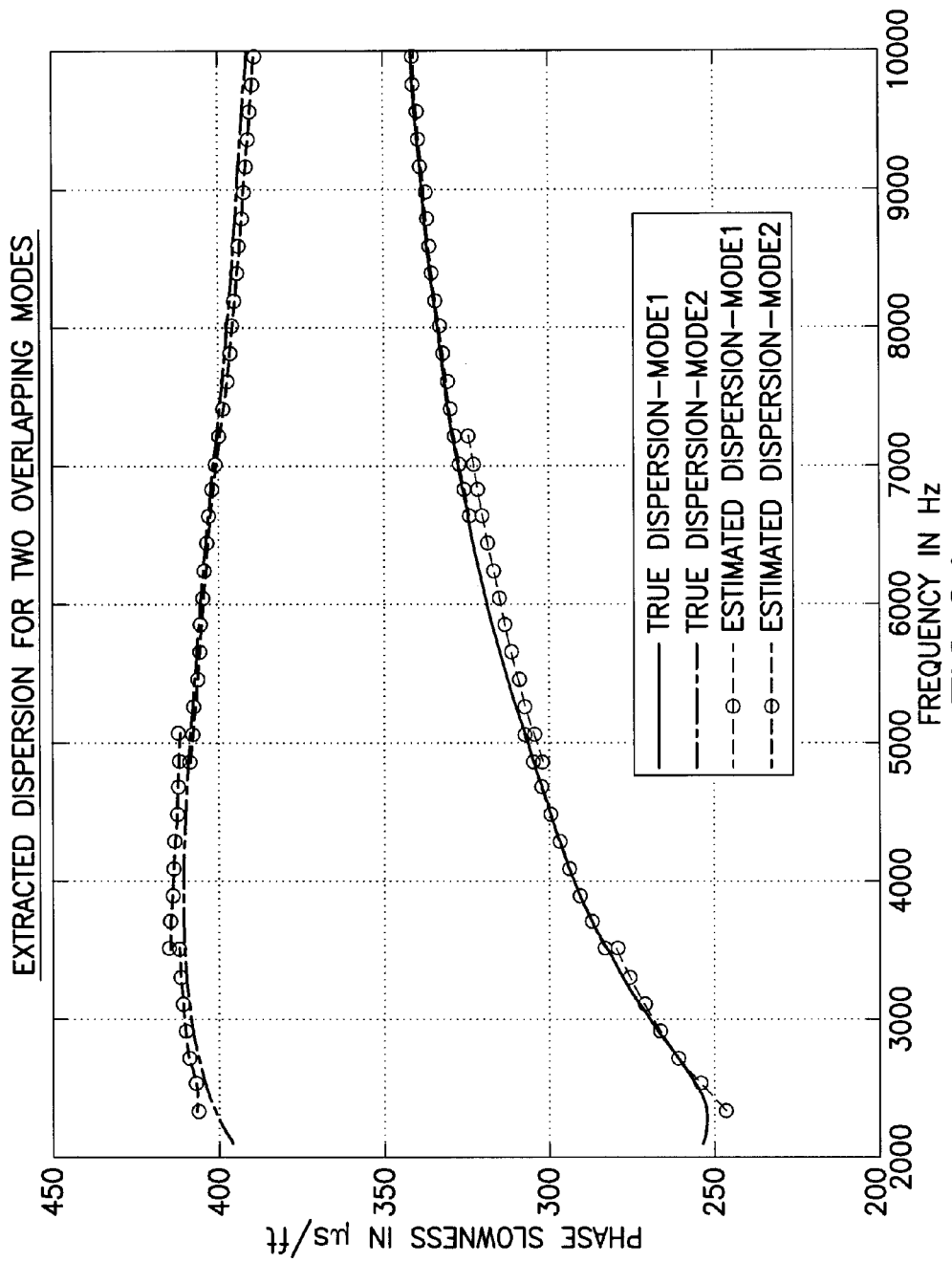
FIG. 21 illustrates extracted dispersion curves in frequency bands. The solid lines denote the true underlying dispersion curves for the two modes. The extracted curves are shown by solid lines marked with circles.

The dispersion extraction using the above approach can be tested for a two mode synthetic problem with considerable time overlap. FIG. 20 shows the array of received waveforms comprising two time overlapping modes and added noise. The SNR is set to be 0 dB in the sense of total signal to total noise energy. In addition, the exponential model is given a perturbation by incorporating sensor gain and phase errors to make the simulation more realistic. FIG. 21 shows the result of applying the described approach in both the f-k and space-time domains in four frequency bands. The solid lines represent the true dispersion curves and the curves marked by circles are the dispersion curves extracted by estimating the phase and group slownesses in these bands. The match of the estimate to the true curves validates the described approach.

In view of the above description it will be appreciated that features of the invention may be implemented in computer programs stored on a computer readable medium and run by processors, application specific integrated circuits and other hardware. Moreover, the computer programs and hardware may be distributed across devices including but not limited to tooling which is inserted into the borehole and equipment which is located at the surface, whether onsite or elsewhere.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for extracting slowness dispersion characteristics of one or more signals in broadband acoustic waves received by an array of two or more sensors comprising:

means for dividing a frequency processing band into frequency sub-bands and for each sub-band:
approximating a dispersion curve;
parameterizing the dispersion curve by phase and group slowness;
forming an over-complete dictionary of broadband basis elements indexed by phase and group slowness;
reconstructing signals having a sparse representation in the over-complete dictionary of the basis elements by using a regularizing parameter $\lambda$;
selecting the regularization parameter $\lambda$ by varying $\lambda$ over a range and detecting changes in distribution of residuals and selecting an operating $\lambda$, where the residual is the difference between the original and the reconstructed signal;
performing mode clustering in phase and group slowness domain; and
outputting a result including estimates of phase and group slownesses; and
means for using the results to produce the slowness dispersion characteristics.

2. The apparatus of claim 1 further including means for using the results to estimate the number of signals.

3. The apparatus of claim 1 wherein the means for approximating a dispersion curve includes means for calculating a linear approximation.

4. The apparatus of claim 1 further including means for using time localization of modes.

5. The apparatus of claim 1 including means for using time localization to perform model order selection, mode consolidation and refinement of group slowness estimates.

6. The apparatus of claim 5 wherein performing model order selection, mode consolidation and refinement of group slowness estimates includes, for each mode, means for choosing a range of move-outs around group slowness estimates and building space-time propagators, $U_a$, using phase slowness estimates and time location estimates of the modes.

7. The apparatus of claim 6 including means for refining group slowness by, for each M tuple of move-outs, $p=[p1, \ldots, pM]' \in \mathbb{R}^{M \times 1}$ finding estimates Ca of coefficients Ca using the relation Y a=Ua(p)Ca+Wa,.

8. The apparatus of claim 7 including means for updating group slowness estimates as:

$$\hat{p}_1, \ldots, \hat{p}_M = \arg\min_{p_1, \ldots, p_M} \|Y_a - U_a(p)\hat{C}_a(p)\|.$$

* * * * *